(12) United States Patent
Kim et al.

(10) Patent No.: US 9,184,631 B2
(45) Date of Patent: Nov. 10, 2015

(54) PHOTOVOLTAIC POWER GENERATION SYSTEM

(75) Inventors: Eungho Kim, Changwon-si (KR); Kwangsoo Lee, Changwong-si (KR)

(73) Assignee: LG Electronics Inc., Seoul (KR)

( * ) Notice: Subject to any disclaimer, the term of this patent is extended or adjusted under 35 U.S.C. 154(b) by 962 days.

(21) Appl. No.: 13/333,330

(22) Filed: Dec. 21, 2011

(65) Prior Publication Data

US 2012/0161523 A1 Jun. 28, 2012

(30) Foreign Application Priority Data

Dec. 28, 2010 (KR) .................. 10-2010-0136478

(51) Int. Cl.
*H02J 1/00* (2006.01)
*H02J 3/00* (2006.01)
*H02J 13/00* (2006.01)
*H02J 3/38* (2006.01)
*H02M 3/158* (2006.01)
*H02M 7/5387* (2007.01)
*H02M 1/00* (2007.01)

(52) U.S. Cl.
CPC ............. *H02J 13/0075* (2013.01); *H02J 3/008* (2013.01); *H02J 3/005* (2013.01); *H02J 3/383* (2013.01); *H02M 3/1588* (2013.01); *H02M 7/5387* (2013.01); *H02M 2001/007* (2013.01); *Y02B 70/1466* (2013.01); *Y02E 10/563* (2013.01); *Y02E 40/72* (2013.01); *Y02E 60/7853* (2013.01); *Y04S 10/123* (2013.01); *Y04S 40/126* (2013.01); *Y10T 307/625* (2015.04)

(58) Field of Classification Search
CPC ............ H02J 3/383; H02J 3/005; H02J 3/008
USPC ......................................................... 307/80
See application file for complete search history.

(56) References Cited

U.S. PATENT DOCUMENTS

2009/0326729 A1* 12/2009 Hakim et al. ................. 700/295
2012/0191263 A1* 7/2012 Kuniyosi ...................... 700/286

FOREIGN PATENT DOCUMENTS

| JP | 2007-336656 | 12/2007 |
| KR | 10-0860337 | 9/2008 |
| KR | 10-2009-0131354 | 12/2009 |

* cited by examiner

*Primary Examiner* — Carlos Amaya
(74) *Attorney, Agent, or Firm* — KED & Associates LLP

(57) ABSTRACT

A photovoltaic power generation system is disclosed, which can allow a user to easily acquire information on a photovoltaic inverter, easily control the photovoltaic inverter, and save electric charges.

15 Claims, 32 Drawing Sheets

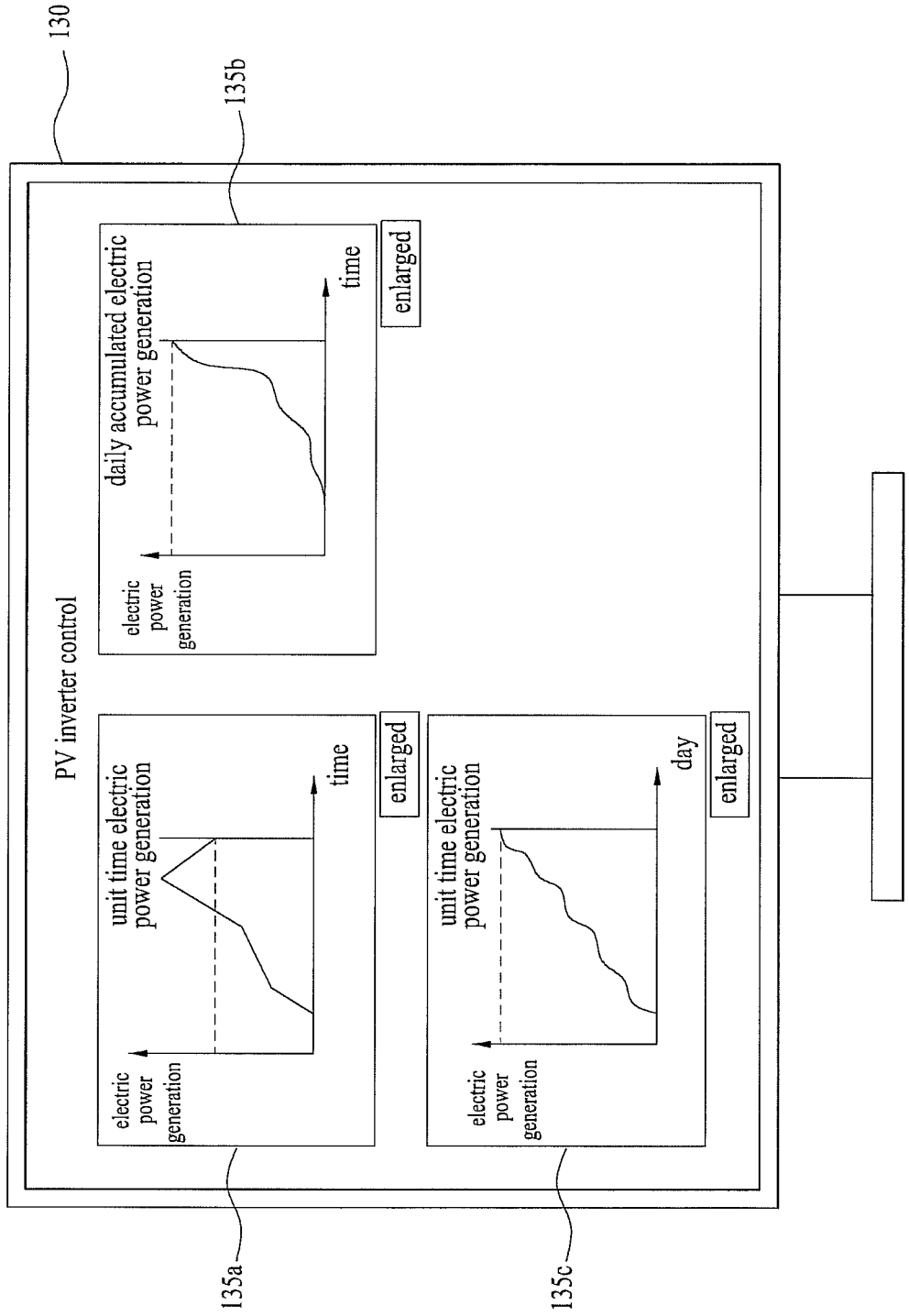

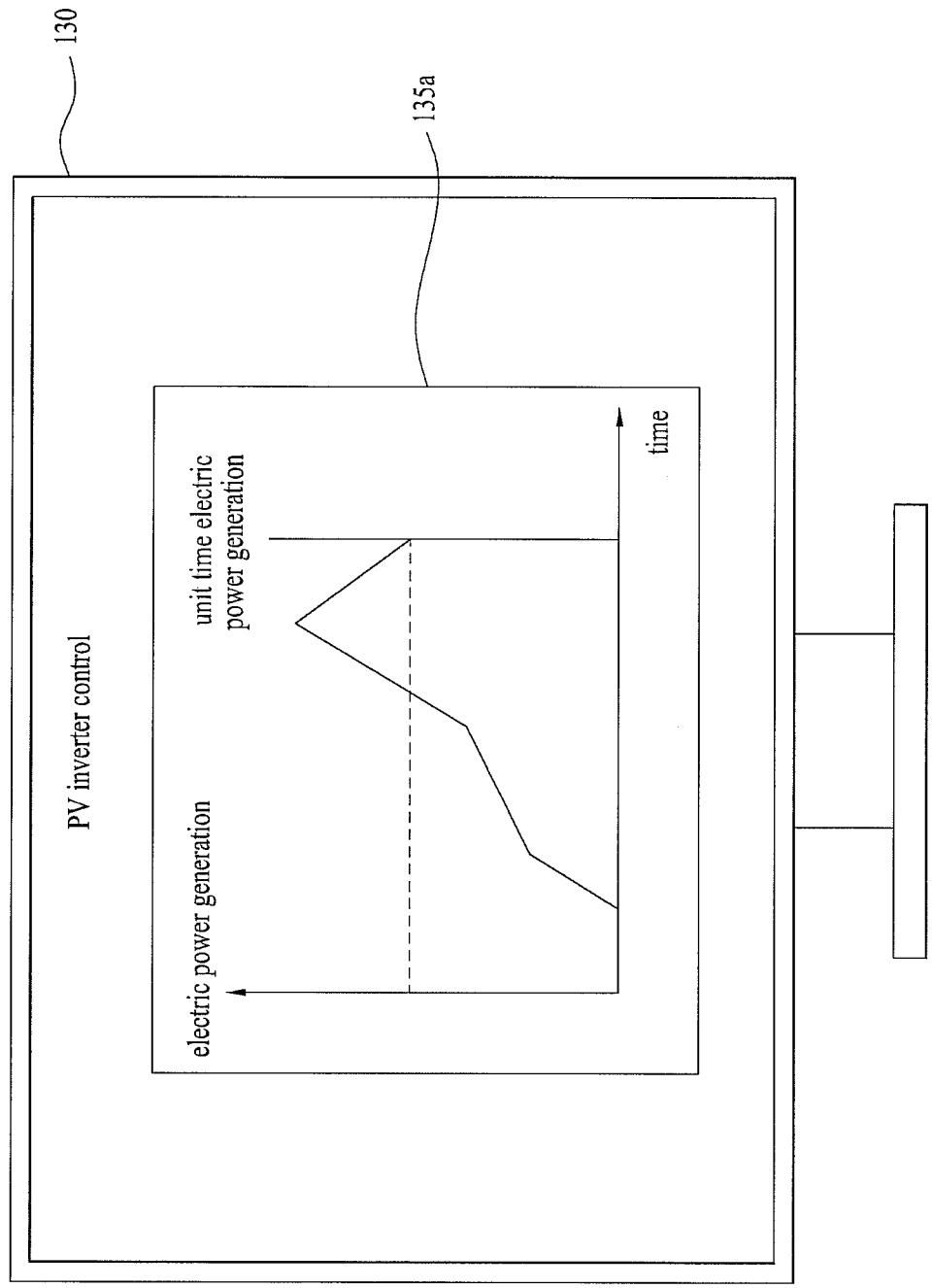

PHOTOVOLTAIC POWER GENERATION SYSTEM

CROSS-REFERENCE TO RELATED APPLICATION(S)

This application claims priority under 35 U.S.C. §119 to Korean Application No. 10-2010-0136478 filed on Dec. 28, 2010, whose entire disclosure is incorporated herein by reference.

BACKGROUND

1. Field

The present invention relates to a photovoltaic power generation system, and more particularly, to a photovoltaic power generation system that can allow a user to easily acquire information on a photovoltaic inverter, easily control the photovoltaic inverter, and save electric charges.

2. Background

Recently, alternative energy sources for replacing the existing energy sources have been developed due to worry about energy depletion. Examples of the alternative energy sources include small hydropower energy, photovoltaic energy, solar thermal energy, wind power energy, waste energy, bio energy, geothermal energy, and ocean energy, as new renewable energies.

In order to use the aforementioned alternative energy sources in a load or grid, a grid connected inverter is required. This grid connected inverter serves to convert and/or invert a DC power input among an alternative energy collecting module, a battery, a grid and a load.

However, it is general that an alternative energy inverter (for example, photovoltaic inverter) according to the related art is installed at a place (for example, the outdoor, the rooftop, or the basement) where a user and/or a manager is not easy or convenient to approach, due to the risk of electric shock or the appearance. For this reason, a problem occurs in that the user and/or the manager should directly move to the place having poor access so as to manipulate or control the alternative energy inverter. Also, a problem occurs in that the user and/or the manager may be exposed to the risk of electric shock even though the user and/or the manager approaches to the place. Moreover, there is inconvenience that the user or the manager should directly move to the place where the photovoltaic inverter is installed, to acquire information on the alternative energy inverter.

Furthermore, a problem occurs in that price information on electricity cannot be identified from the grid in real time. The price information could restrictedly be identified through a power exchange. A problem also occurs in that a pricing policy is variable depending on time zones. Although electric charge peak time system that includes an electric charge peak time zone corresponding to the most expensive electric charge time zone is partially carried out in each field, a problem occurs in that inducements such as incentive for a consumer through pricing change cannot be used. In order to solve the problems and improve efficiency of energy, active studies on a smart grid have been recently made. The necessity of a photovoltaic power generation system or a photovoltaic processing system associated with the smart grid has been suggested.

SUMMARY OF THE INVENTION

Accordingly, the present invention is directed to a photovoltaic power generation system that substantially obviates ones or more problems due to limitations and disadvantages of the related art.

An object of the present invention is to provide a photovoltaic power generation system that can allow a user to easily manipulate a photovoltaic inverter even though the user directly does not go to a place where the photovoltaic inverter is installed.

Another object of the present invention is to provide a photovoltaic power generation system that can allow a user to easily acquire information on a photovoltaic inverter even though the user directly does not go to a place where the photovoltaic inverter is installed.

Other object of the present invention is to provide a photovoltaic power generation system that can allow a user to save an electric charge.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a photovoltaic power generation system according to the present invention comprises a smart meter measuring power information in real time while performing bidirectional communication with a grid which is a power supply source, and performing bidirectional communication with a load module consuming a power; a PV inverter inverting a DC electric energy generated from a PV module to an AC electric energy; a wire or wireless communication module installed in the PV inverter to transmit information on the PV inverter; a control device including a wire or wireless communication module receiving the information on the PV inverter and the power information measured by the smart meter, and controlling an operation mode of the PV inverter on the basis of the information on the PV inverter and the power information measured by the smart meter; and a terminal linked with the control device through a wireless communication network, wherein the terminal provides the information on the PV inverter to a user.

According to the photovoltaic power generation system of the present invention, the user can easily manipulate the photovoltaic inverter even though the user directly does not go to a place where the photovoltaic inverter is installed. In this case, the present invention can improve use convenience of the user for the photovoltaic inverter. Also, the user can easily acquire information on the photovoltaic inverter even though the user directly does not go to a place where the photovoltaic inverter is installed, whereby monitoring convenience of the user for information on the photovoltaic inverter can be improved. Also, since the photovoltaic inverter can be driven by a smart grid mode, an electric charge of the user can be saved.

It is to be understood that both the foregoing general description and the following detailed description of the present invention are exemplary and explanatory and are intended to provide further explanation of the invention as claimed.

BRIEF DESCRIPTION OF THE DRAWINGS

The embodiments will be described in detail with reference to the following drawings in which like reference numerals refer to like elements wherein:

FIGS. 12a to 12c are diagrams illustrating a PV inverter control screen displayed in the control device of FIG. 11;

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

The present invention relates to a (new) renewable energy processing system, for example, a processing system of small hydropower energy, photovoltaic (PV) energy, solar thermal energy, wind power energy, waste energy, bio energy, and geothermal energy. A control device 100 blocks an electric energy transmission line between a PV inverter 30 and a grid 70, and at the same time blocks an electric energy transmission line between the PV inverter 30 and a load module L. In other words, the control device 100 controls the PV inverter 30 and the electric energy transmission line so that the load module L is supplied with electric energy required for driving from the grid 70 only and is not supplied with any electric energy from the PV inverter 30 and the electric energy supplied from the grid 70 is not charged in a PV module through the PV inverter 30. The present invention also relates to a system that processes a power generated from a (new) renewable energy such as ocean energy. The power generated from the processed (new) renewable energy may be supplied to a grid 70, a load and a battery. In this case, the power may be associated with a smart grid.

Hereinafter, in order to assist understanding of the present invention and for convenience in description of the applicant, the photovoltaic processing system based on the photovoltaic as the (new) renewable energy will be described.

Figure 1A:
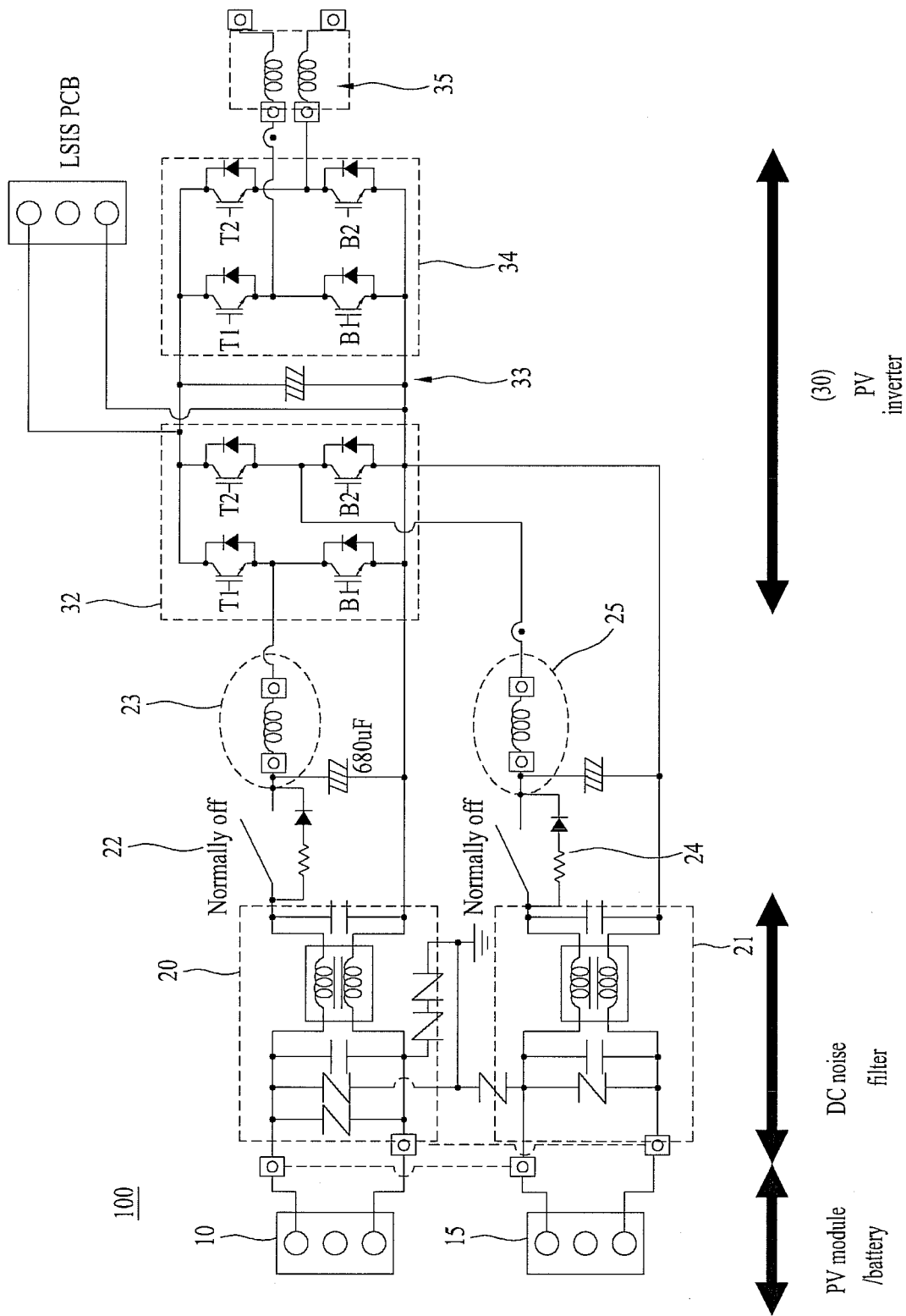
FIGS. 1a and 1b are schematic diagrams illustrating an example of a photovoltaic processing system according to the present invention.
Figure 1B:
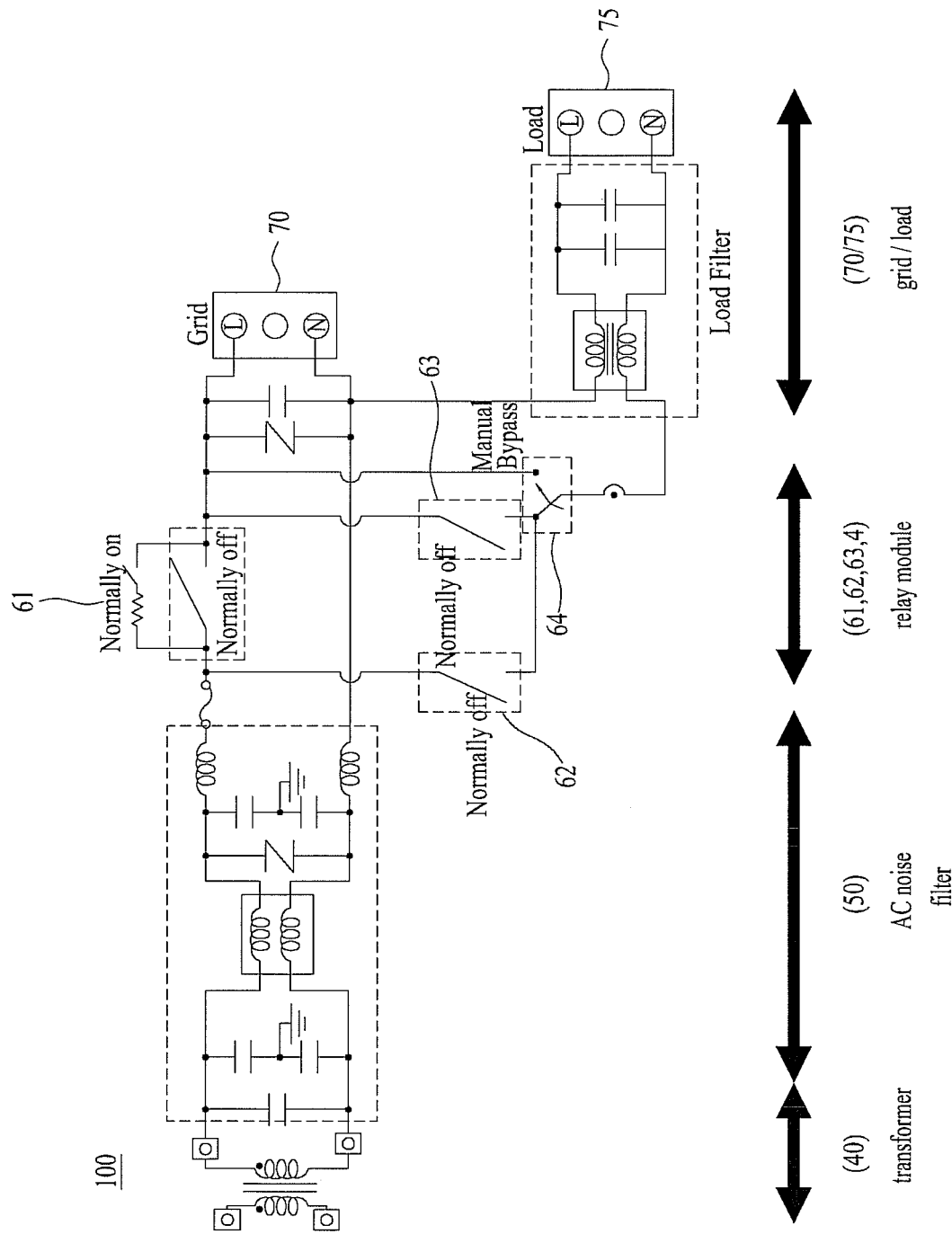

FIGS. 1a and 1b are schematic diagrams illustrating an example of a photovoltaic processing system according to the present invention.

Referring to FIGS. 1a and 1b, the photovoltaic processing system according to the present invention includes basic elements such as a PV module or PV cell 10 (hereinafter, referred to as 'PV module') and/or a battery 15, a PV inverter 30, and a grid 70 or load 75. The photovoltaic processing system may further include additional elements required between the above basic elements. Hereinafter, the basic elements will be described in brief for convenience of description, and the additional elements will be described in detail when an operation mode of the photovoltaic processing system according to the present invention is described.

First of all, the basic elements of the photovoltaic processing system will be described in brief. The PV module 10 is a set of at least one or more PV arrays, and collects the PV and converts the collected PV into an electric signal (DC power).

The battery 15 charges the power supplied from the PV module 10 or the grid 70 or discharges the power charged in the grid 70 and/or the load 75.

The PV inverter 30 converts and/or inverts the DC power input among the PV module 10, the battery 15, the grid 70 and the load 75 in accordance with an operation mode which will be described later. To this end, the PV inverter 30 includes a DC/DC converter 32 boosting or buck-converting the input DC power, and a DC/AC converter 34 inverting the input DC power to an AC power. In this case, both the DC/DC converter 32 and the DC/AC converter 34 or any one of the two converters may be used as the PV inverter 30 in accordance with the operation mode which will be described later. Also, if the PV inverter 30 according to the present invention is a grid-connected type inverter, for example, it may serve as an inverter charger in the relation with a PV power conditioning system (PCS) and the battery 15.

In addition, the PV inverter 30 may be controlled by an external device (not shown) in accordance with various communication protocols such as RS485. A control element in the smart-grid environment may be used as the external device. In other words, the PV inverter 30, which will perform various operation modes of the photovoltaic processing system, may be controlled under the control of the control element in the smart-grid environment.

Referring to FIGS. 1a and 1b, the photovoltaic processing system according to the present invention has a multi-string structure having a plurality of input terminals. In this case, the plurality of input terminals may be connected with the same element or may be connected with their respective elements different from one another. For example, in FIGS. 1a and 1b, in the multi-string structure having two input terminals, the first input terminal is connected with the PV module 10 and the second input terminal is connected with the battery 15. Also, in the present invention, only one PV inverter 30 is linked with the two imputer terminals in respect of the multi-string structure. In this case, connection between each input terminal and the PV inverter 30 may be controlled through a relay. As described above, although the two input terminals are only illustrated in FIGS. 1a and 1b, they are only exemplarily, and it will be apparent that more PV modules 10 and batteries 15 may be connected as occasion demands.

The load 75 may include a critical load such as a computer and lighting, and a normal load such as heating ventilation and air conditioning (HVAC) and appliances.

As described above, the photovoltaic processing system according to the present invention may be operated by various modes (hereinafter, referred to as 'operation modes') in accordance with an object or request.

For example, the first operation mode is a mode that supplies the power generated from the PV mode 10 to the grid 70 or the load 75, the second operation mode is a mode that supplies the power generated from the PV module 10 to the battery 15 and charges the power, the third operation mode is a mode that supplies the power generated from the grid 70 to the battery 15 and charges the power, the fourth operation mode is a mode that supplies the power charged in the battery 15 to the grid 70, the fifth operation mode is a mode that supplies the power charged in the battery 15 to the load 75, and the sixth operation mode is a mode that blocks connection with the photovoltaic processing system when a system error occurs and at the same time connects the grid 70 with the load 75.

Hereinafter, the aforementioned operation modes will be described in more detail with the configuration or path of the photovoltaic processing system.

First Operation Mode

The first operation mode is directed to a process of supplying the DC power generated from the PV module 10 to the grid 70 or the load 75.

Hereinafter, the process will be described in detail as follows.

The DC power generated from the PV module 10 is filtered by a DC noise filter 20.

The PV inverter 30 performs processing required to supply the filtered DC power to the grid 70 or the load 75.

For example, the DC/DC converter 32 controls switching of the switching device and converts the DC power into a voltage of a DC link terminal 33 if the filtered DC power is input through a DC reactor 23. In this specification, an insulated gate bipolar transistor (IGBT) is used as the switching device. In the drawing, the IGBTs at the top are referred to as top switches T1 and T2 while the IGBTs at the bottom are referred to as bottom switches B1 and B2. The bottom switch B1 connected with the DC reactor 23 is turned on and controlled to perform switch operation, and the top switch T1 is turned off so that energy is transferred to the DC link terminal 33 through a diode.

Figure 2:
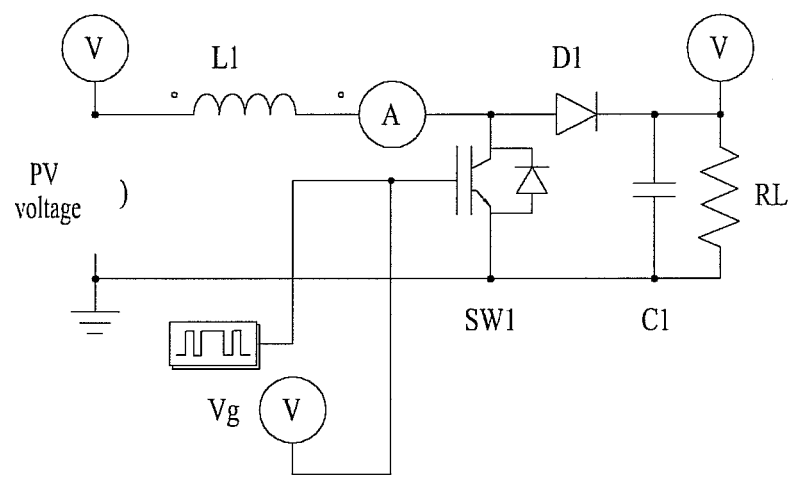
FIG. 2 is an example of an equivalent circuit illustrating a process of converting the power output from a PV module at a DC link terminal and storing the converted power.
Figure 3:
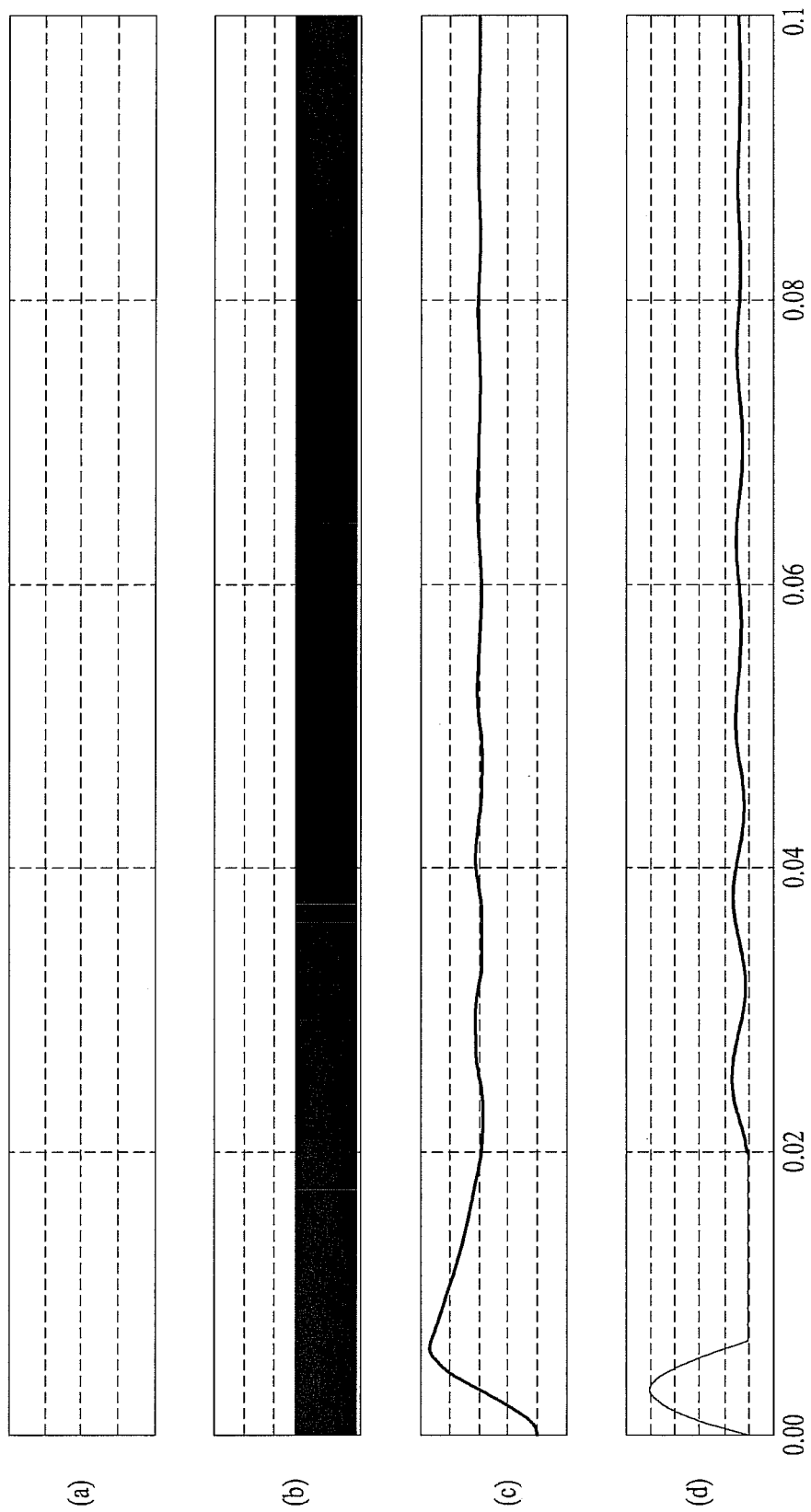
FIG. 3 and FIG. 4 are detailed graphs illustrating a voltmeter and ammeter connected with each part of FIG. 2.
Figure 4:
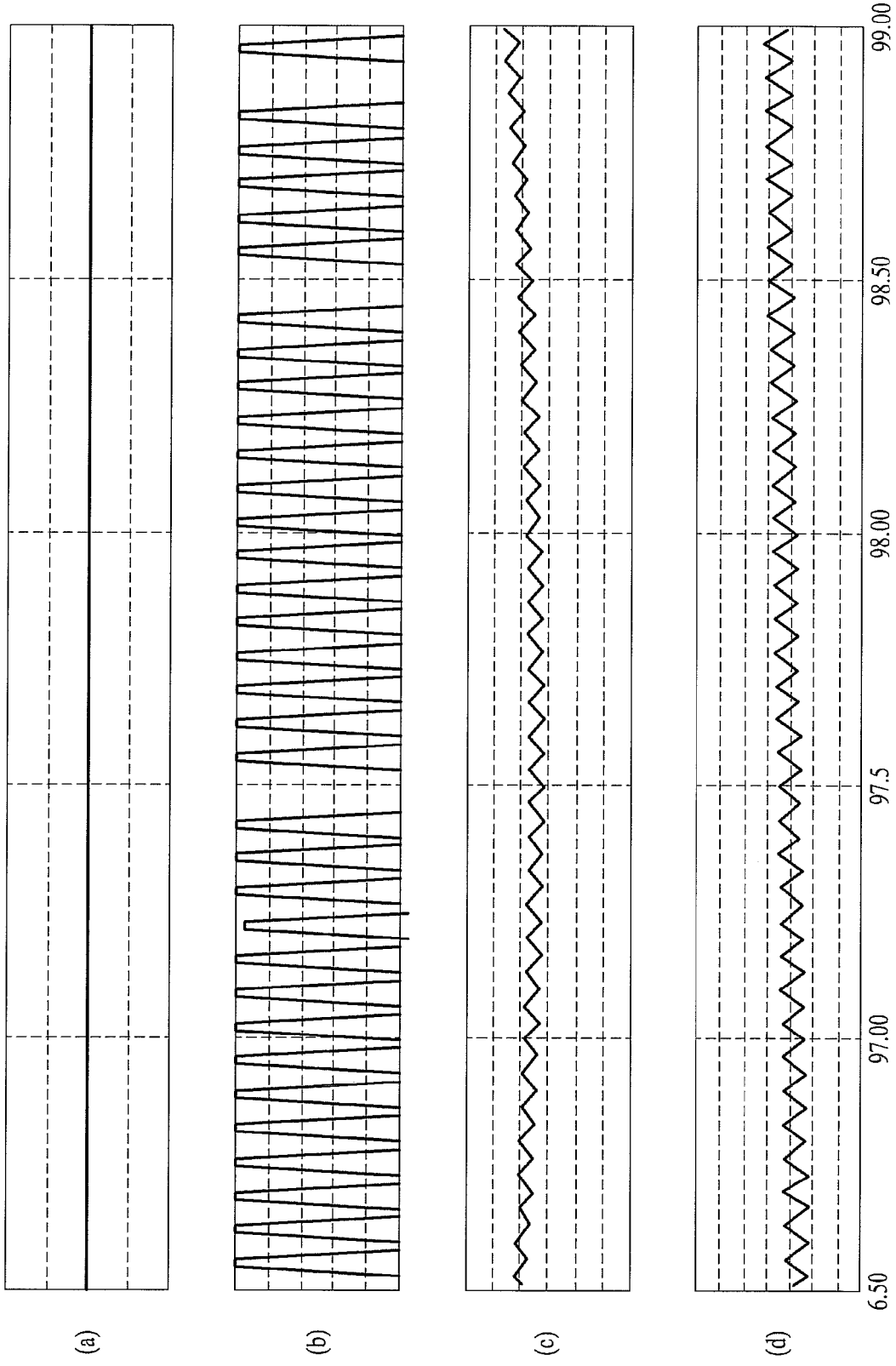

This will be described in more detail with reference to the accompanying drawings. FIG. 2 to FIG. 4 are diagrams illustrating an operation of the DC/DC converter 32 of the PV inverter 32 in the photovoltaic processing system according to the present invention and graphs at each part.

FIG. 2 is an example of an equivalent circuit illustrating a process of converting the power output from the PV module 10 at the DC link terminal 33 and storing the converted power. For convenience of description, in the drawing, the DC reactor 23 is marked with L1, the bottom switch B1 is marked with SW1, a diode based on T1 switch-off is marked with D1, and the DC link terminal 33 is marked with C1.

Detailed graphs of voltmeters V1, V2 and V3 and ammeter 11 connected with each part of FIG. 2 are shown in FIG. 3 and FIG. 4.

(a) of FIG. 3 is a graph illustrating the DC power (=voltage) generated from the PV module 10, (b) of FIG. 3 is a graph illustrating a pulse width modulation (PWM) signal input to a gate of the switch SW1 for switching of the switch SW1, (c) of FIG. 3 is a graph illustrating a voltage at the DC link terminal 33, and (d) of FIG. 3 is a graph illustrating current variation at the DC reactor L1.

(a) to (d) of FIG. 4 are enlarged graphs of a part A in (a) to (d) of FIG. 3. The part A in (a) to (d) of FIG. 3 may mean a part where the DC power boosted by the DC/DC converter 32 is stabilized.

The function of the DC/DC converter 32 will be described with reference to FIG. 2. The DC power is input from the PV module 10 as shown in (a) of FIG. 3, and switching occurs in the switch SW1 if the PWM signal is input to the gate of the switch SW1 as shown in (b) of FIG. 3.

For example, if the switch SW1 is turned on by the PWM signal, a current of the inductor L1 is increased by the input DC voltage of the PV module 10, whereby energy is stored in the L1. On the other hand, if the switch SW1 is turned off by the PWM signal, the energy stored in the L1 is transferred to a load $R_L$ through D1, whereby the energy is stored in the C1. Also, the voltage stored in the C1 is transferred to the load $R_L$ as a circuit is opened during switch-on of the switch SW1, whereby a saw-toothed waveform is formed as shown in (c) of FIG. 3 or (c) of FIG. 4. Also, since the L1 is repeatedly charged and discharged depending on switching of the switch SW1, a saw-toothed waveform is formed as shown in (d) of FIG. 3 or (d) of FIG. 4. In this case, it is noted that a voltage boosted by a PWM on/off duty ratio as shown in (b) of FIG. 3 or (b) of FIG. 4, i.e., the voltage of the DC link terminal 33 is determined.

As described above, in FIGS. 1a and 1b, since the PV inverter 30 serves as an inverter charger for the battery 15 in the relation with the battery 15, the DC/DC converter 32 is operated at the same principle even in case of buck at a discharge mode of the battery 15, for example, at the fifth operation mode and the sixth operation mode.

In addition, the DC/DC converter 32 does not always boost the input DC power. In other words, the DC/DC converter 32 measures a level of the input DC power, and may bypass boosting of the DC power if the measured level of the input DC power is determined that boosting is not required.

The DC/AC inverter 34 converts the DC power input from the DC link terminal 33 into the AC power by switching the IGBT devices.

Figure 5:
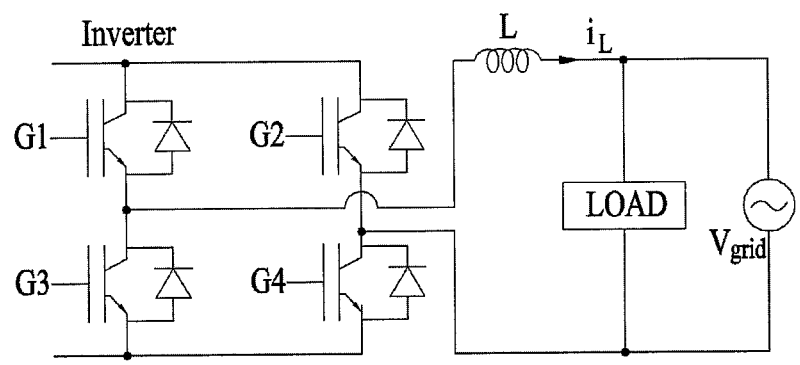
FIG. 5 is an example of an equivalent circuit of a DC/AC inverter illustrating a process of inverting a DC power to an AC power.
Figure 6:
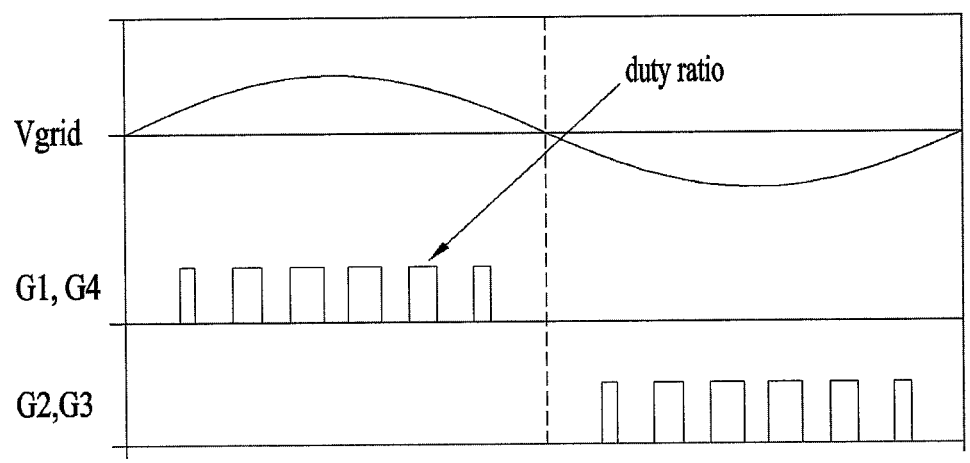
FIG. 6 is an example of a waveform graph illustrating a PWM signal controlling a switching operation of each of switching devices G1 to G4 of a DC/AC inverter.
Figure 7:
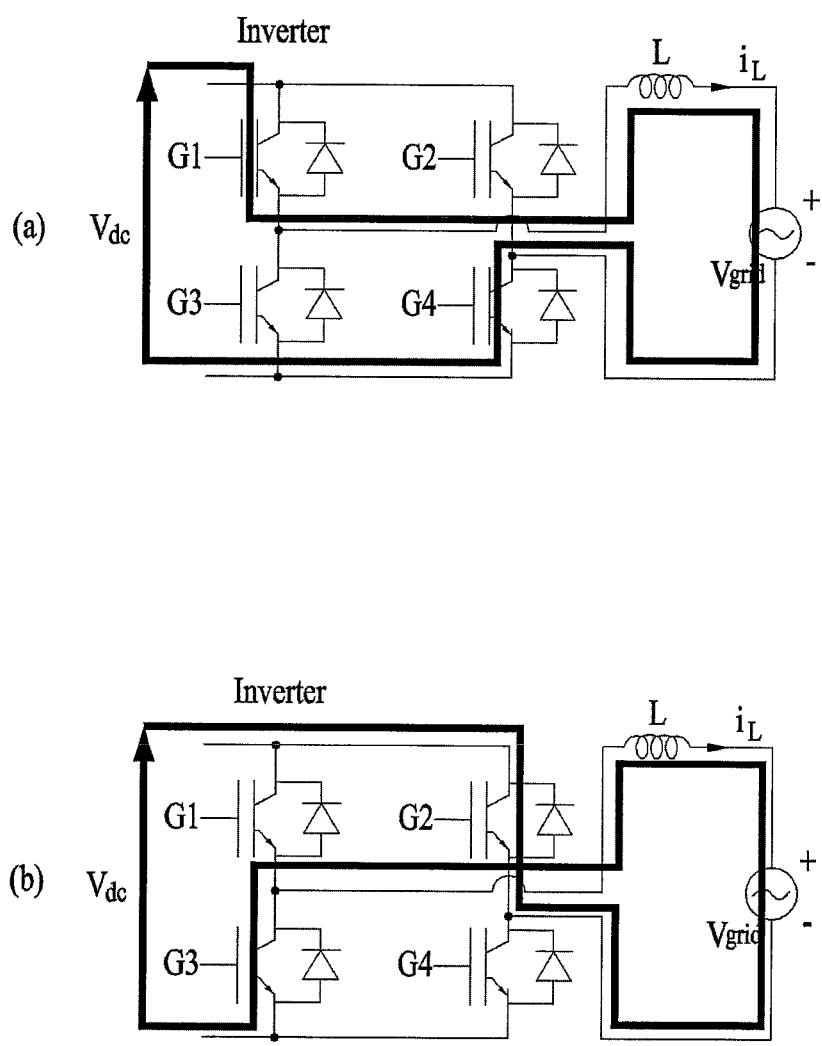
FIG. 7 is a diagram illustrating each switching device turned on/off depending on the PWM signal of FIG. 6 and a voltage relation between a flow of a current based on each switching device and a grid.

This will be described in more detail with reference to the accompanying drawings. FIG. 5 to FIG. 7 are diagrams illustrating an operation of the DC/AC converter 34 of the PV inverter 30 in the photovoltaic processing system according to the present invention and graphs at each part.

FIG. 5 is an example of an equivalent circuit of the DC/AC inverter 34 illustrating a process of inverting energy stored in the DC link terminal 33, i.e., the DC power to the AC power. For convenience of description, in the drawing, T1 of the DC/AC inverter 34 in FIGS. 1a and 1b is marked with G1, T2 is marked with G2, B1 is marked with G3, and B2 is marked with G4. The AC reactors 35 are marked with L, and a current along L is marked with $I_L$. Also, the voltage of the DC link terminal 33 is marked with $V_{dc}$.

FIG. 6 is an example of a waveform graph illustrating a PWM signal controlling a switching operation of each of switching devices G1 to G4 of the DC/AC inverter 34.

FIG. 7 is a diagram illustrating each switching device turned on/off depending on the PWM signal of FIG. 6 and a voltage relation between a flow of a current based on each switching device and a grid 70.

For example, G1 and G4 are turned on based on the PWM waveform shown in FIG. 6, and a PWM duty ratio is controlled so that G2 and G3 are turned on. This PWM waveform is repeatedly input.

In this case, if G1 and G4 are turned on by the PWM waveform, the flow of the current at the circuit of FIG. 5 forms a loop through G1 and G4 as shown in (a) of FIG. 7. At this time, the voltage of the grid 70, i.e., Vgrid of FIG. 6 has a curve Vgrid>0 as shown in (a).

On the other hand, if G2 and G3 are turned on by the PWM waveform, the flow of the current at the circuit of FIG. 5 forms a loop through G2 and G3 as shown in (b) of FIG. 7 on the contrary to the flow of the current of (a) of FIG. 7. At this time, the voltage of the grid 70, i.e., Vgrid of FIG. 6 has a curve Vgrid<0 as shown in (b).

This operation is repeatedly performed, whereby the DC voltage of the DC link terminal 33 is inverted to the AC voltage.

The inverted AC voltage is transformed to a desired power by a transformer 40 and then supplied to the grid 70 or the load 75. At this time, the photovoltaic processing system further includes relay modules 61 to 64 between the transformer 40 and the grid 70 or the load 75, and supplies the transformed AC power to a destination through the relay modules 61 to 64.

Moreover, the photovoltaic processing system may perform filtering for the AC power transformed by the transformer 40, by using an AC noise filter 50. Also, the transformer 40 transforms the power to the AC power suitable for the destination, i.e., the grid 70 or the load 75.

Second Operation Mode

The second operation mode is directed to a process of supplying the DC power generated from the PV module to the battery 15 and charging the battery.

The second operation mode will be described based on a part different from the first operation mode, and the operation or process of the first operation mode will be used to describe the same or like process. Accordingly, the detailed description of the second operation mode the same or similar to the first operation will be omitted.

In the second operation mode, the process of converting the DC power generated from the PV module 10 in the DC/DC (buck) converter 32 of the PV inverter 30 through the DC noise filter 20 and storing it in the DC link terminal 33 is substantially identical with that of the first operation mode. Accordingly, this process of the second operation mode will be understood from that of the first operation mode.

Referring to FIGS. 1a and 1b, if energy is stored in the DC link terminal 33 through switching of the devices T1 and B1 in accordance with the first operation mode, i.e., if the DC voltage is stored in the DC link terminal 33, the DC voltage applied to the DC link is charged in the battery 15 through switching of the devices T2 and B2.

For example, after the DC power is charged in the DC link terminal 33 by turning off T1 and turning on B1 in the same process as that of the first operation mode, T2 is turned on and B1 is turned off unlike the first operation mode, whereby the power of the DC link terminal 33 is transmitted to the battery in reverse order of the aforementioned description.

Third Operation Mode

The third operation mode is directed to a process of supplying the power to the battery and charging it similarly to the second operation mode. However, in the third operation mode, the power is not supplied from the PV module 10 but supplied from the grid 70.

The process of charging the power supplied from the grid 70 in the battery 15 in accordance with the third operation mode will be described in brief with reference to FIGS. 1a and 1b. The power generated from the grid 70 is supplied to the PV inverter 30 through the AC filter 50, the transformer 40, and the AC reactors 35. The DC/AC inverter 34 of the PV inverter 30 inverts the AC power to the DC power and outputs the inverted power to the DC link terminal 33 to store the energy therein by performing the process of FIG. 5 to FIG. 7 in reverse order. The energy stored in the DC link terminal 33 is converted by the DC/DC (buck) converter 32 and then charged in the battery 15. In this case, since the switching operation of the DC/DC (buck) converter 32 is the same as that of the DC/DC converter in the second operation mode, its detailed description will be omitted.

The third operation mode may be used if an error occurs in the PV module 10, or if the power is not supplied from the PV module 10 by an environment or other conditions. For example, under the smart-grid environment, if supply of the power generated from the grid 70 is cheaper than charging the power generated from the PV module 10 in the battery 15, the third operation mode may be used.

Fourth Operation Mode

The fourth operation mode is directed to a process of discharging the DC power charged in the battery 15 instead of the PV inverter 30 and supplying it to the grid 70. The fourth operation mode is similar to the first operation mode, and corresponds to a reverse process of the third operation mode.

Similarly to the third operation mode, the fourth operation mode may be used if the power is not supplied from the PV module 10 sufficiently or if the DC power is charged in the battery 15 at a sufficient level. In this case, the sufficient level may mean that the battery 15 is not fully discharged.

Referring to FIGS. 1a and 1b, the fourth operation mode is similar to the first operation mode except that the PV module 10 of the first operation mode is changed to the battery 15. The switching devices T2 and B2 of the DC/DC converter 32 serve as the switching devices T1 and B1 of the first operation mode. Also, unlike the first operation mode, since the power is not generated from the PV module 10 in the fourth operation mode, it may not be filtered by the DC noise filter 21. Since the process next to the DC link terminal 33 is substantially identical with that of the first operation mode, its detailed description will be omitted.

Fifth Operation Mode

The fifth operation mode is performed in the same manner as the fourth operation mode except that the power charged in the battery 15 is discharged, i.e., supplied to the load 70 not the grid 70. Accordingly, relay modules 61 to 64 and a load filter may additionally be required.

Sixth Operation Mode

Unlike the aforementioned first to fifth operation modes, if an error occurs in the system, for example, the PV module 10, the battery 15 and the PV inverter 30 corresponding to the elements prior to the grid 70 or the load 75, connection between the system and the grid 70 or the load is blocked, and the grid 70 is connected with the load 75 at the same time or at another time different from the blocked time, i.e., at the time when power supply to the load is required. In other words, in the sixth operation mode, the AC power generated from the grid 70 is directly supplied to the load 75.

Although on/off control of each relay module has not been described in detail, the relay module may basically be on/off-controlled for connection between both ends in accordance with each of the aforementioned operation modes.

For example, in case of the first operation mode, relay module 1 22 and relay module 3 61 are turned on while the other relay modules are turned off. In case of the second operation mode, relay module 1 22 and relay module 2 are turned on while the other relay modules are turned off. In case of the third and fourth operation modes, relay module 2 24 and relay module 3 61 are turned on while the other relay modules are turned off. In case of the fifth operation mode, relay module 2 24, relay module 4 62 and relay module 6 64 are turned on while the other relay modules are turned off. Finally, in case of the sixth operation mode, relay module 5 63 and relay module 6 64 are turned on while the other relay modules are turned off. These relay modules may be turned on/off by a MICOM that controls the photovoltaic processing system.

Although the aforementioned six operation modes may be implemented in the photovoltaic processing system shown in FIGS. 1a and 1b, the present invention is not limited to such examples and more various operation modes may be implemented in the present invention. Accordingly, it is to be understood that the scope of the present invention is not limited to the aforementioned operation modes, and various operation modes may be implemented by the person with ordinary skill in the art by using the photovoltaic processing system in the same or similar principle as that described in this specification without departing from the scope of the present invention.

Hereinafter, the photovoltaic power generation system according to the present invention will be described based on the aforementioned photovoltaic processing system.

Figure 8:
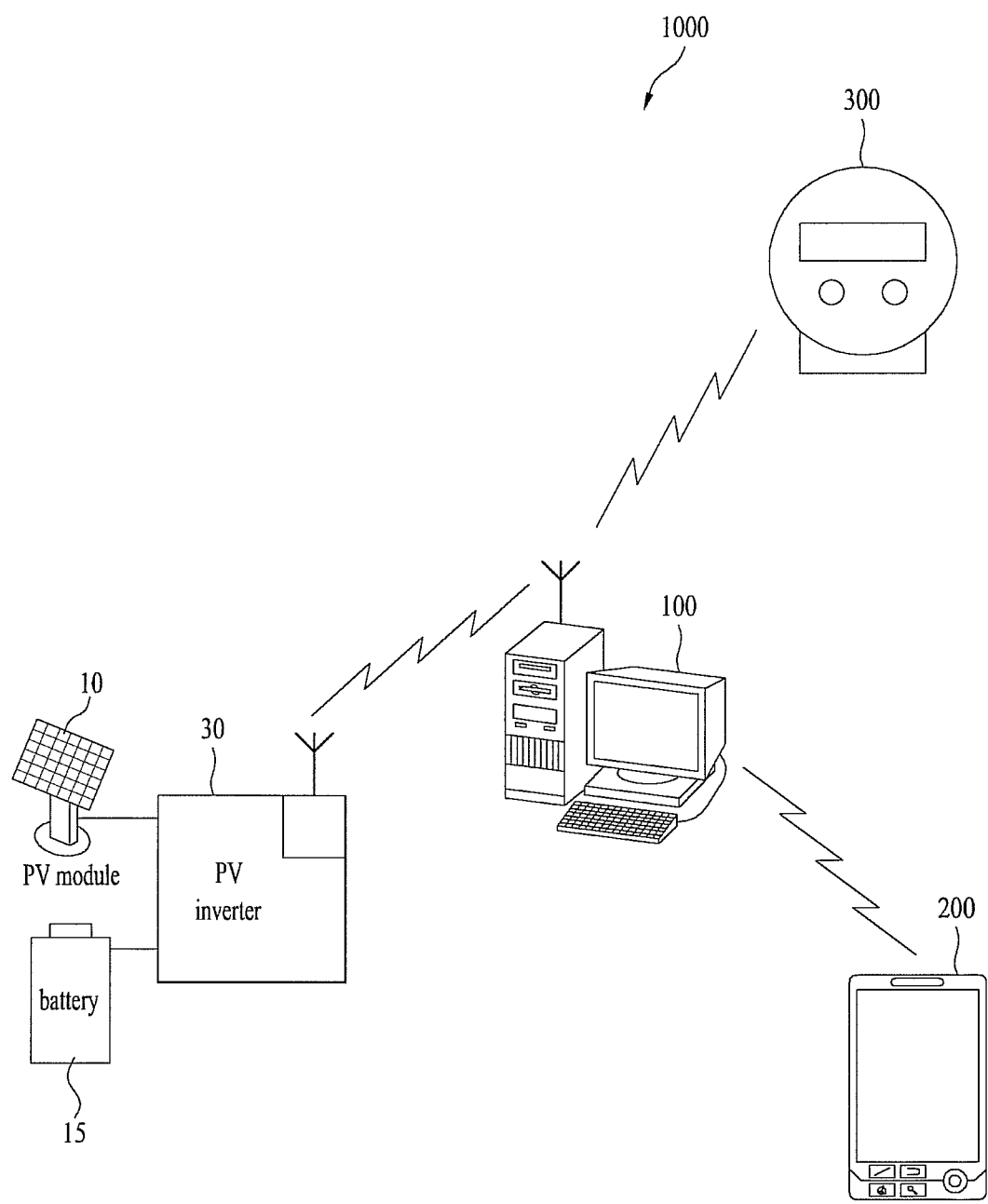
FIG. 8 is a brief diagram illustrating a photovoltaic power generation system according to the present invention.

FIG. 8 is a brief diagram illustrating a photovoltaic power generation system 1000 according to the present invention.

As shown in FIG. 8, the photovoltaic power generation system according to the present invention includes a PV inverter 30 inverting a DC electric energy generated from the PV module to an AC electric energy, a wire or wireless communication module provided in the PV inverter 30 to transmit information on the PV inverter 30, a control device 100 provided with a wire or wireless communication module receiving information on the PV inverter 30, and a terminal 200 linked with the control device 100 through a wireless communication network.

The PV inverter 30 converts and/or inverts the DC power input among the PV module 10, the battery 15, the grid 70 and the load 75. To this end, the PV inverter 30 includes a DC/DC converter 32 boosting or buck-converting the input DC power, and a DC/AC converter 34 inverting the input DC power to an AC power. In particular, the PV inverter 30 according to the present invention serves to invert the DC electric energy generated from the PV module to the AC electric energy as described above.

The PV inverter 30 includes a wire or wireless communication module transmitting information on the PV inverter 30 to the control device 100 and receiving a control signal from the control device 100.

At this time, the information on the PV inverter includes at least one or more of an input voltage measurement value or input current measurement value input to the PV inverter 30, an output voltage measurement value or output current measurement value output from the PV inverter 30, information on an operation state of the PV inverter 30, information on an operation mode of the PV inverter 30, and information on electric power generation of the PV inverter 30.

Since it is general that the PV inverter 30 is spatially located to be close to the control device 100, wireless communication between the PV inverter 30 and the control device 100 may preferably be short distance wireless communication. Accordingly, if a communication mode provided in the PV inverter 30 is a wireless communication mode, a communication module provided in the PV inverter 30 may preferably be one of a Zigbee communication module or a Bluetooth communication module. However, these communication modules are only exemplary, and the present invention is not limited to the above communication modules.

The control device 100 receives an input signal of a user, converts the input signal to a control signal, and controls the operation of the PV inverter 30. If the input signal of the user is an initial setting value, the control device 100 may automatically control the PV inverter to conform to the initial setting value.

The control device 100 includes a wire or wireless communication module that receives information on the PV inverter 30 or transmits a control signal to the PV inverter 30. In the same manner as the PV inverter 30, the wire or wireless communication module provided in the control device 100 may preferably include one of a Zigbee communication module or a Bluetooth communication module. Also, for long distance bidirectional wireless communication with the terminal 200, the wire or wireless communication module of the control device 100 further includes a communication module, which can access a wireless communication network such as a mobile communication network or a wireless data communication network.

The terminal 200 includes a communication module that can access a wireless communication network such as a mobile communication network or a wireless data communication network. The terminal 200 may provide information on the PV inverter to the user through the communication module or may allow the user to control the operation of the PV inverter 30 through the communication module and the control device 100. In other words, the terminal 200 is configured to be linked with the control device 100 through the wireless communication network.

For this reason, the user may easily collect the information on the PV inverter by using any one of the control device 100 located at the indoor or the portable terminal 200 even though he/she does not move to that place where the PV inverter 30 is installed. Also, the user may conveniently control the operation of the PV inverter 30.

As additional embodiment of the present invention, the photovoltaic power generation system 1000 according to the present invention may further include a smart meter 300 that measures power information (for example, information on electric charges) in real time while performing bidirectional communication with the grid which is the power supply source, and performs bidirectional communication with the load module L consuming the power. According to the additional embodiment of the present invention, the control device 200 according to the present invention may further include a wire or wireless communication module that receives information on the PV inverter and power information measured by the smart meter, and may control the operation mode of the PV inverter based on the power information measured by the smart meter.

At this time, the smart meter 300 may transmit the power information (for example, information on electric charges) to the control device, and the control device may calculate electric charges corresponding to the electric power generation of the PV module in real time based on the power information.

Figure 9:
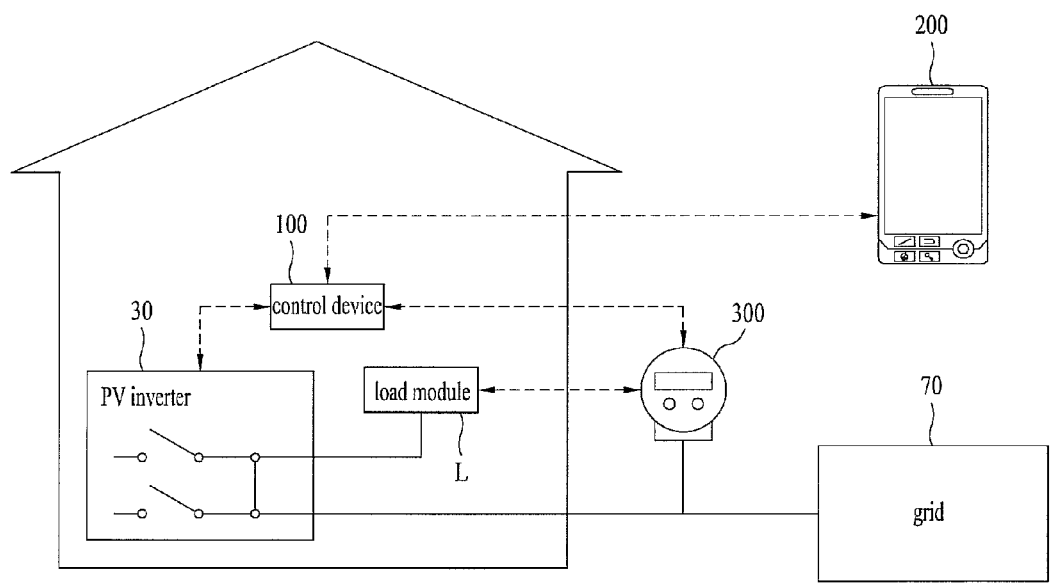
FIG. 9 is a brief block line diagram illustrating a photovoltaic power generation system according to the present invention.

FIG. 9 is a brief block line diagram illustrating a photovoltaic power generation system 1000 according to the present invention. In FIG. 9, a broken line is a data or signal transmission line, and a solid line is an electric energy transmission line.

The photovoltaic power generation system 1000 according to the present invention, as described above, includes a PV inverter 30, a control device 100 controlling the PV inverter 30, and a terminal 200 linked with the control device 100 and the wireless communication network.

The PV inverter 30 is connected with the electric energy transmission line to transmit and receive electric energy to and from the grid 70 such as the power supply source, and at the same time is connected to the electric energy transmission line of the load module L (or load) that is supplied with output electric energy output from the PV inverter 30 and supplied with electric energy from the grid 70.

The control device 100 is connected with the PV inverter 30 through the data or signal transmission line, and at the same time is connected with the terminal. The data or signal transmission line may be formed through the wire or wireless communication module.

According to the present invention, the user may control the PV inverter 30 through any one of the terminal 200 and the control device 100 along the data or signal transmission line of the wire or wireless communication mode, and the control device 100 may selectively supply or block the electric energy among the load module L, the PV inverter 30 and the grid 70 in accordance with the input signal of the user through any one of the terminal 200 and the control device 100 and the operation mode of the PV inverter 30 which will be described later.

Figure 10A:
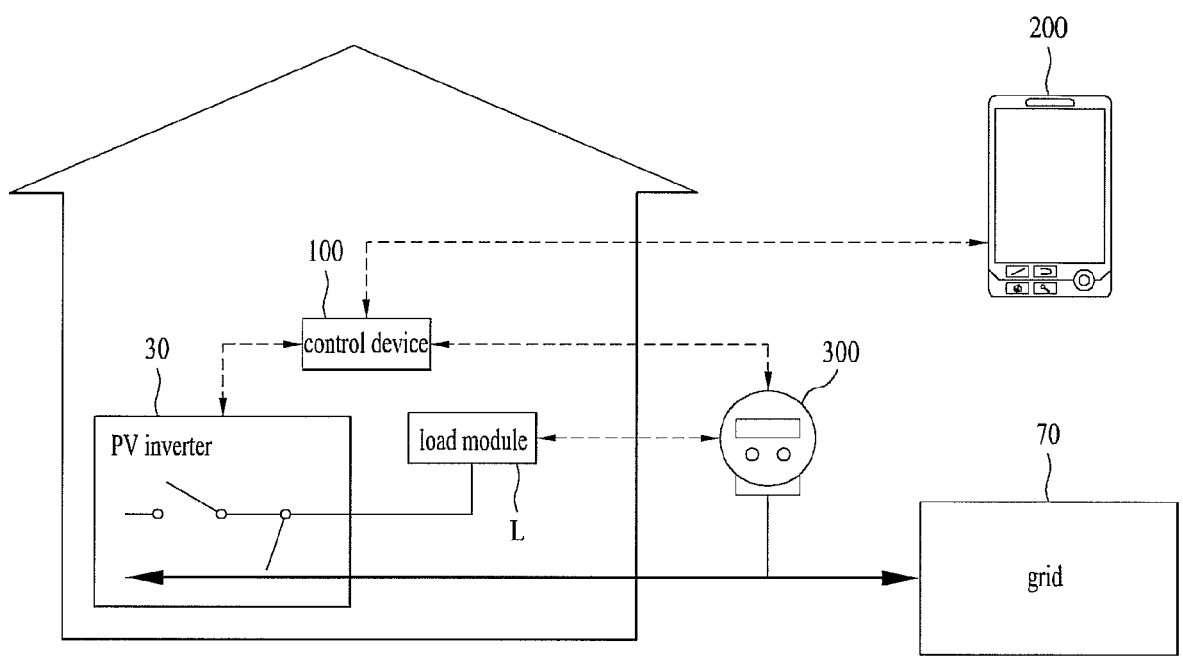
FIGS. 10a to 10c are brief block line diagrams illustrating an operation mode of a PV inverter according to the present invention.
Figure 10B:
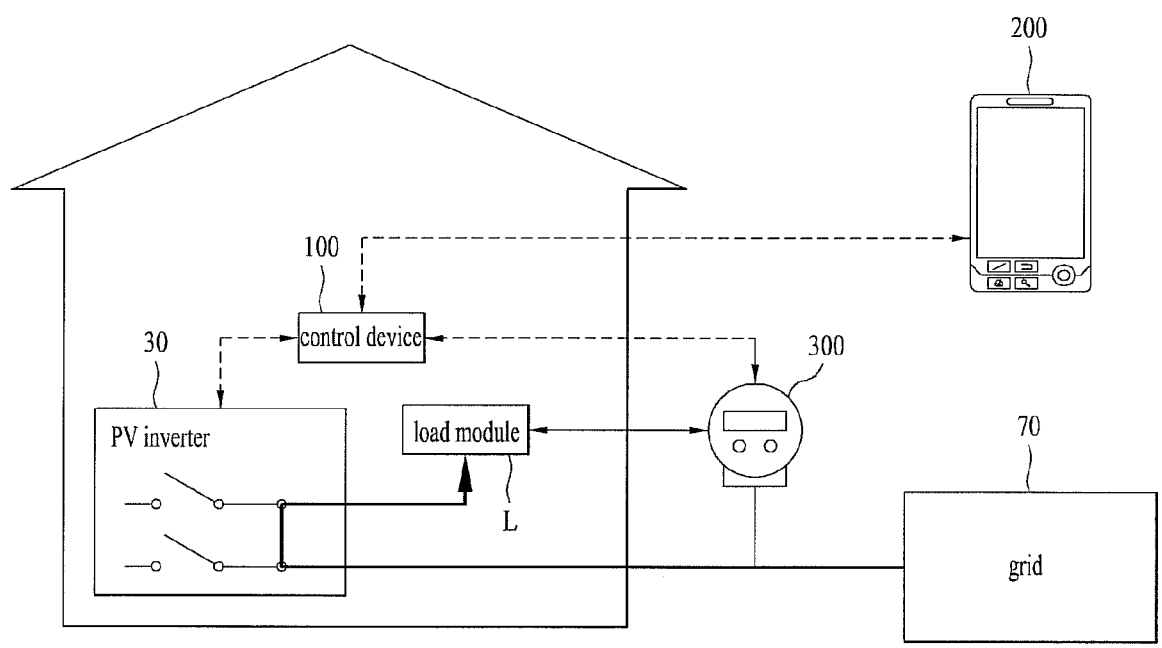
Figure 10C:
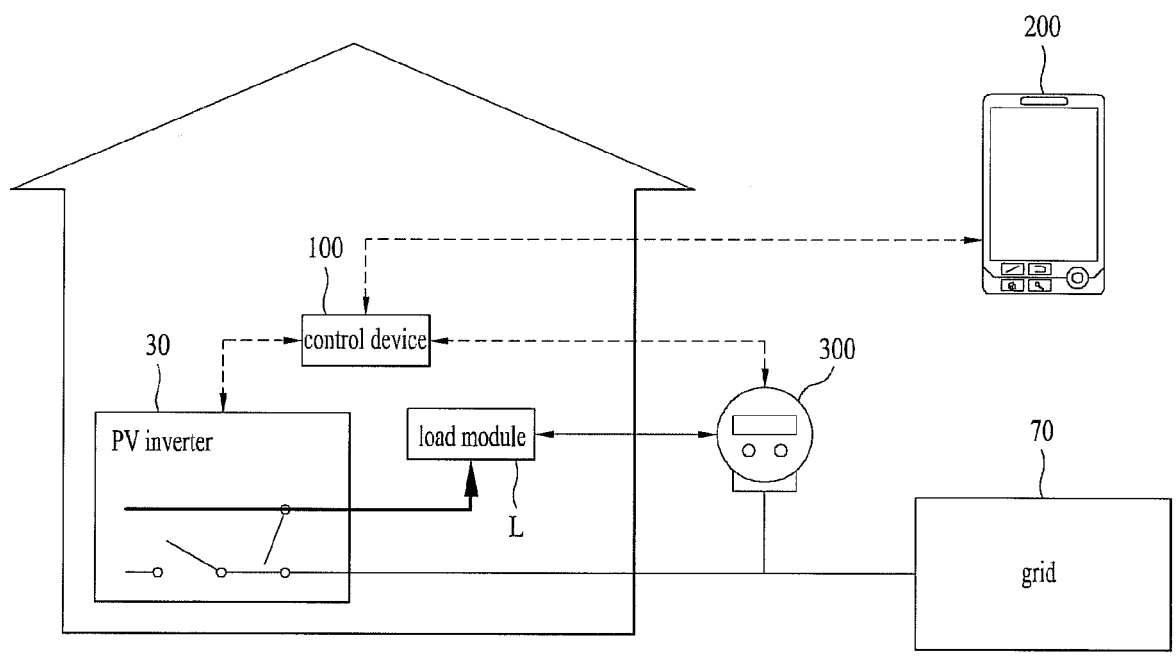

FIGS. 10a to 10c are brief block line diagrams illustrating an operation mode of a PV inverter 30 according to the present invention. Hereinafter, the operation mode of the PV inverter 30 according to the present invention based on supply and block paths of electric energy will be described with reference to FIGS. 10a to 10c.

The operation mode of the PV inverter 30 includes a grid connected mode connecting the power generated from the PV inverter 30 with the external grid 70, an inverter block mode blocking the PV inverter 30 from the external grid 70 when the PV inverter 30 is operated in error, and a power failure mode in which the power generated from the PV inverter 30 is used as the consumed power during power failure. However, the above modes are only exemplary, and the present invention is not limited to the above modes. The operation mode of the PV inverter 30 according to the present invention may further include the aforementioned first to sixth operation modes.

FIG. 10a is a brief diagram illustrating the grid connected mode of the operation modes of the PV inverter 30. As shown in FIG. 10a, if the PV inverter 30 is operated in accordance with the grid connected mode, the PV inverter 30 inverts the DC electric energy generated from the PV module to the AC electric energy in accordance with the control signal of the control device 100 to transmit the AC electric energy to the grid 70, or inverts the AC electric energy supplied from the grid 70 to the DC electric energy to supply the electric energy to the battery 15 mounted together with the PV module 10, thereby charging the battery 15.

The grid connected mode may be used if surplus electric energy remaining after the electric energy generated from the PV module is charged in the battery is supplied to the grid 70 or is sold, or if the electric energy supplied from the grid 70 is stored in the battery as no electric energy is consumed by the load module L while the user or manager is out. In other words, according to the present invention, as the grid connected mode is provided, if surplus electric energy of the PV module or the battery is sold to the grid 70 or if electric energy is little consumed or not consumed at all by the load module L and the electric energy supplied from the grid 70 is cheap, the cheap electric energy may previously be stored in the battery.

FIG. 10b is a brief diagram illustrating the inverter block mode of the operation modes of the PV inverter 30. As shown in FIG. 10b, if the PV inverter 30 is operated in accordance with the inverter block mode, the control device 100 blocks the electric energy transmission line between the PV inverter 30 and the grid 70, and at the same time blocks the electric energy transmission line between the PV inverter 30 and the load module L. In other words, the control device 100 controls the PV inverter 30 and the electric energy transmission line so that the load module L is supplied with the electric energy required for driving from the grid 70 only and the electric energy supplied from the grid 70 is not charged in the PV module through the PV inverter 30.

The inverter block mode may be used if the PV module or the PV inverter 30 is out of order and/or is operated in error. In other words, in the present invention, as the inverter block mode is provided, the PV module or the PV inverter 30 may be prevented from being damaged by the electric energy supplied from the grid 70, and the grid 70 or the load module L may be prevented from being damaged as an unstable output voltage or current is supplied to the grid 70 or the load module L due to breakdown and/or error operation of the PV module or the PV inverter 30.

FIG. 10c is a brief diagram illustrating the power failure mode of the operation modes of the PV inverter 30. As shown in FIG. 10c, if the PV inverter 30 is operated in accordance with the power failure mode, the control device 100 blocks the electric energy transmission line between the PV inverter 30 and the grid 70, and at the same time blocks the electric energy transmission line between the grid 70 and the load module L. In other words, the control device 100 controls the PV inverter 30 or the electric energy transmission line so that the electric energy generated from the PV module or the electric energy stored in the battery is converted and then the converted electric energy is supplied to the load module L.

The power failure mode may be used if the electric energy is not supplied from the grid 70 due to error operation or breakdown of the grid 70. In other words, in the present invention, as the power failure mode is provided, the user may be prevented from being subjected to inconvenience as the electric energy is not supplied to the load module L.

Figure 11:
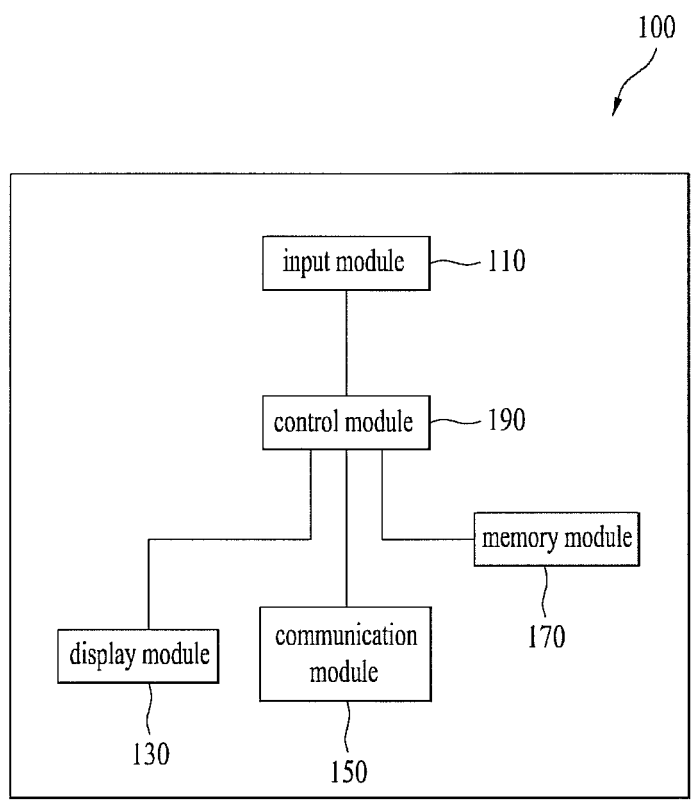
FIG. 11 is a brief block line diagram illustrating a control device according to the present invention.

FIG. 11 is a brief block line diagram illustrating a control device 100 according to the present invention.

As shown in FIG. 11, the control device 100 includes an input module 110 receiving an input signal of the user or manager, a display module 130 displaying the output based on the input signal, a wire or wireless communication module 150 accessible to the wire or wireless communication network, a memory module 170 in which a previously set program or command language is stored, and a control module 190 automatically controlling the display module 130 and the communication module 150 in accordance with the input signal through the input module 110 or if a previously set condition is satisfied, and converting the input signal to the control signal of the PV converter 30.

Preferably, the control device 100 may be one of a computer, a home server of a home network system, and an energy management device of a smart grid system.

The control module 190 of the control device 100 may control the display module 130 to display the information on the PV inverter, which is received through the communication module 150, in a graph or diagram. The information on the PV inverter may include an input voltage measurement value or input current measurement value input to the PV inverter 30, an output voltage measurement value or output current measurement value output from the PV inverter 30, information on an operation state of the PV inverter 30, information on an operation mode of the PV inverter 30, and information on electric power generation of the PV inverter 30. The information on the PV inverter, which is displayed in a graph or diagram, will be described in more detail as follows.

The control device 100 may be remotely controlled by the terminal 200 through the wireless communication network. In other words, if the input signal is received through the terminal 200 connected through the wireless communication network, the control device 100 may control the PV inverter 30 to convert the input signal to the control signal of the PV inverter 30 through the control module 190.

Figure 12A:
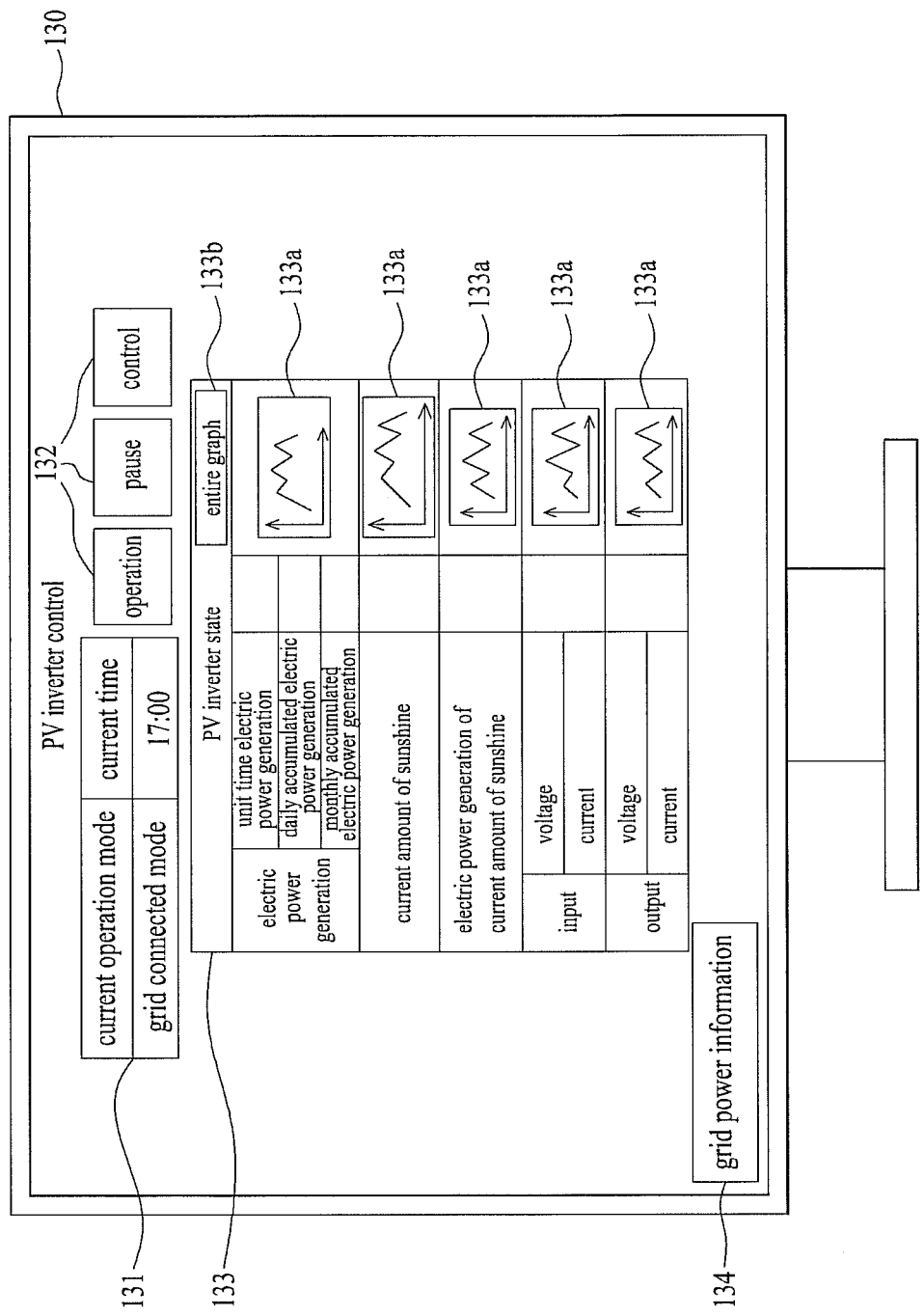
Figure 13A:
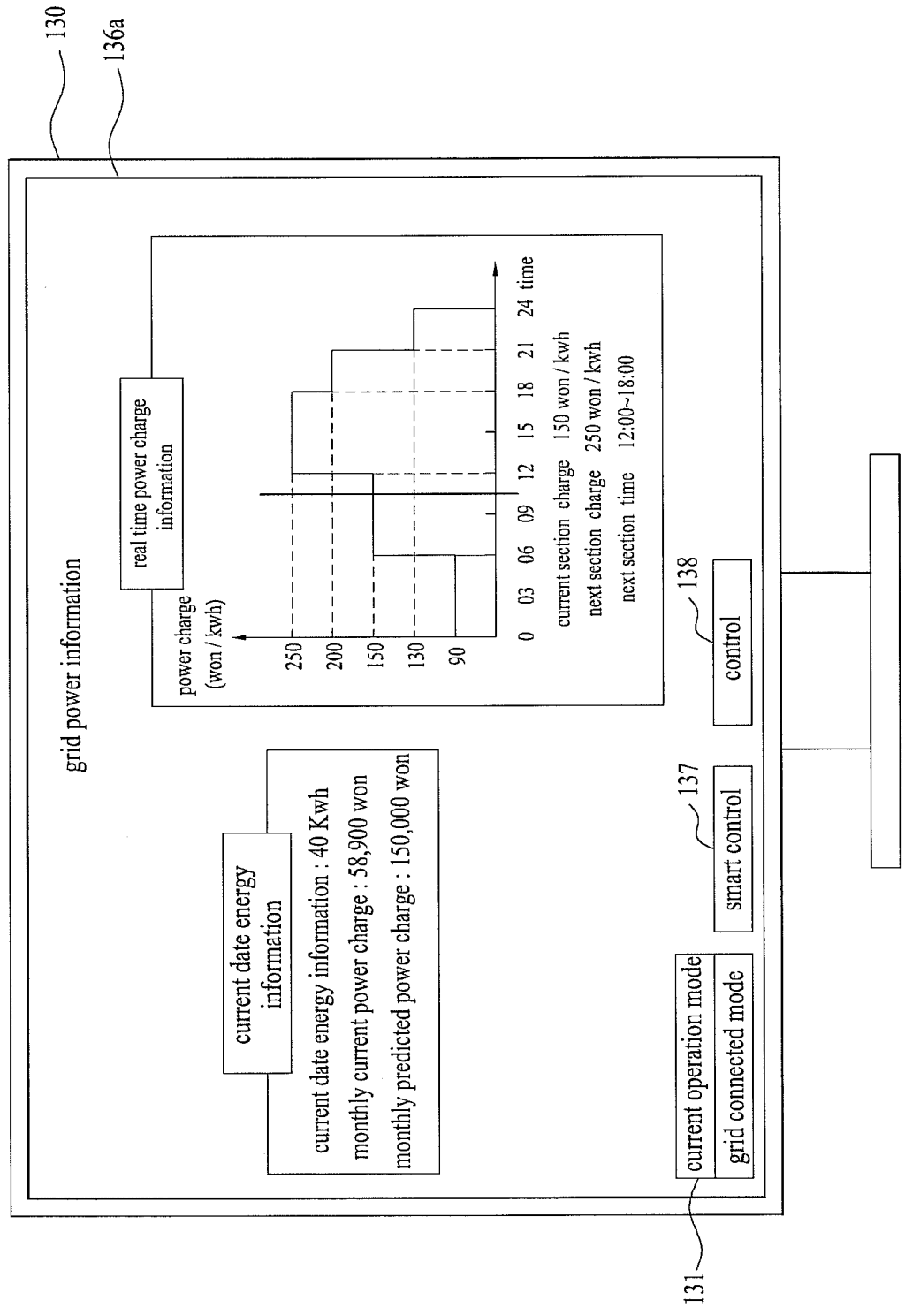
FIGS. 13a to 13e are diagrams illustrating a grid power information screen displayed in the control device of FIG. 11.
Figure 13B:
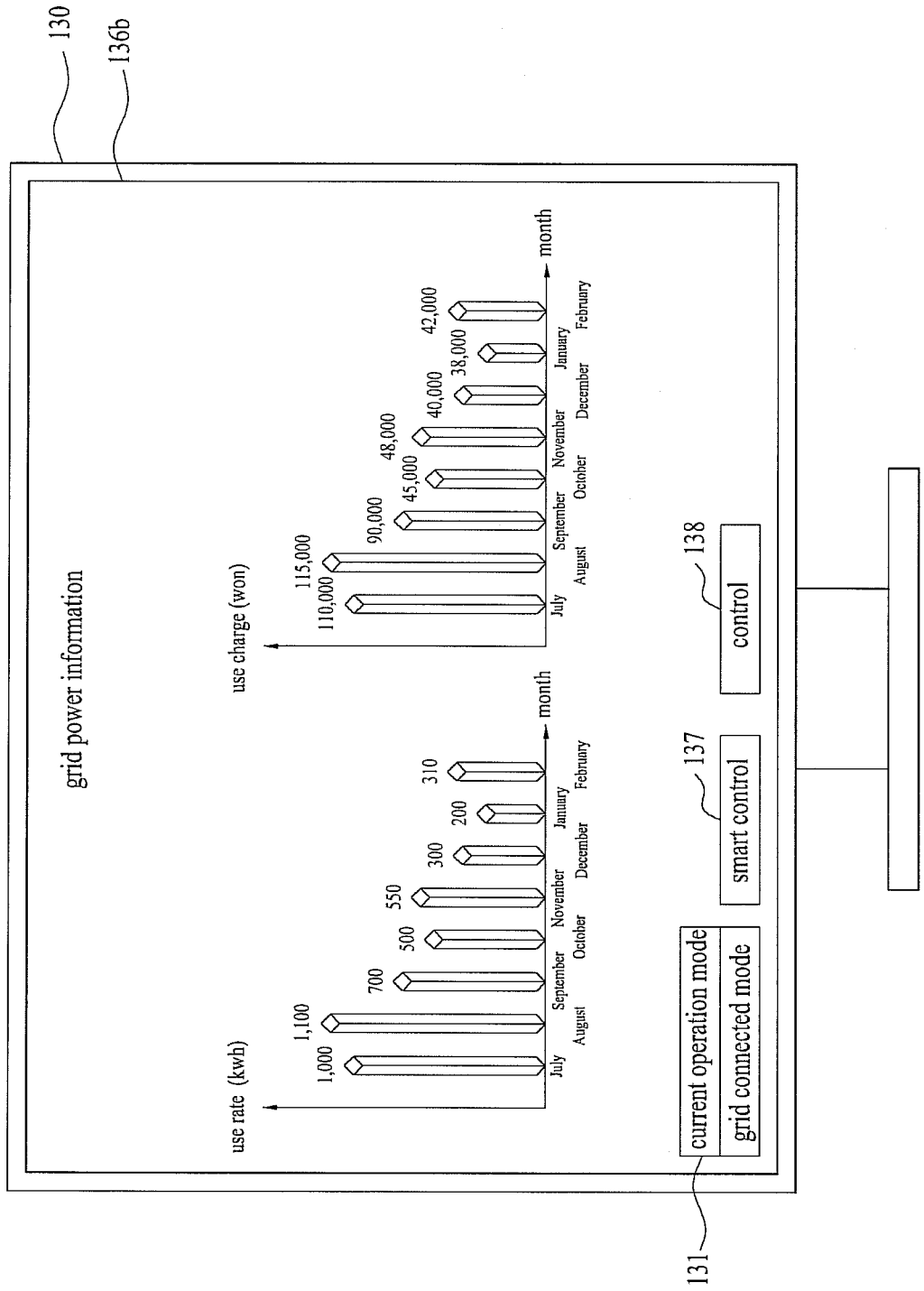
Figure 13C:
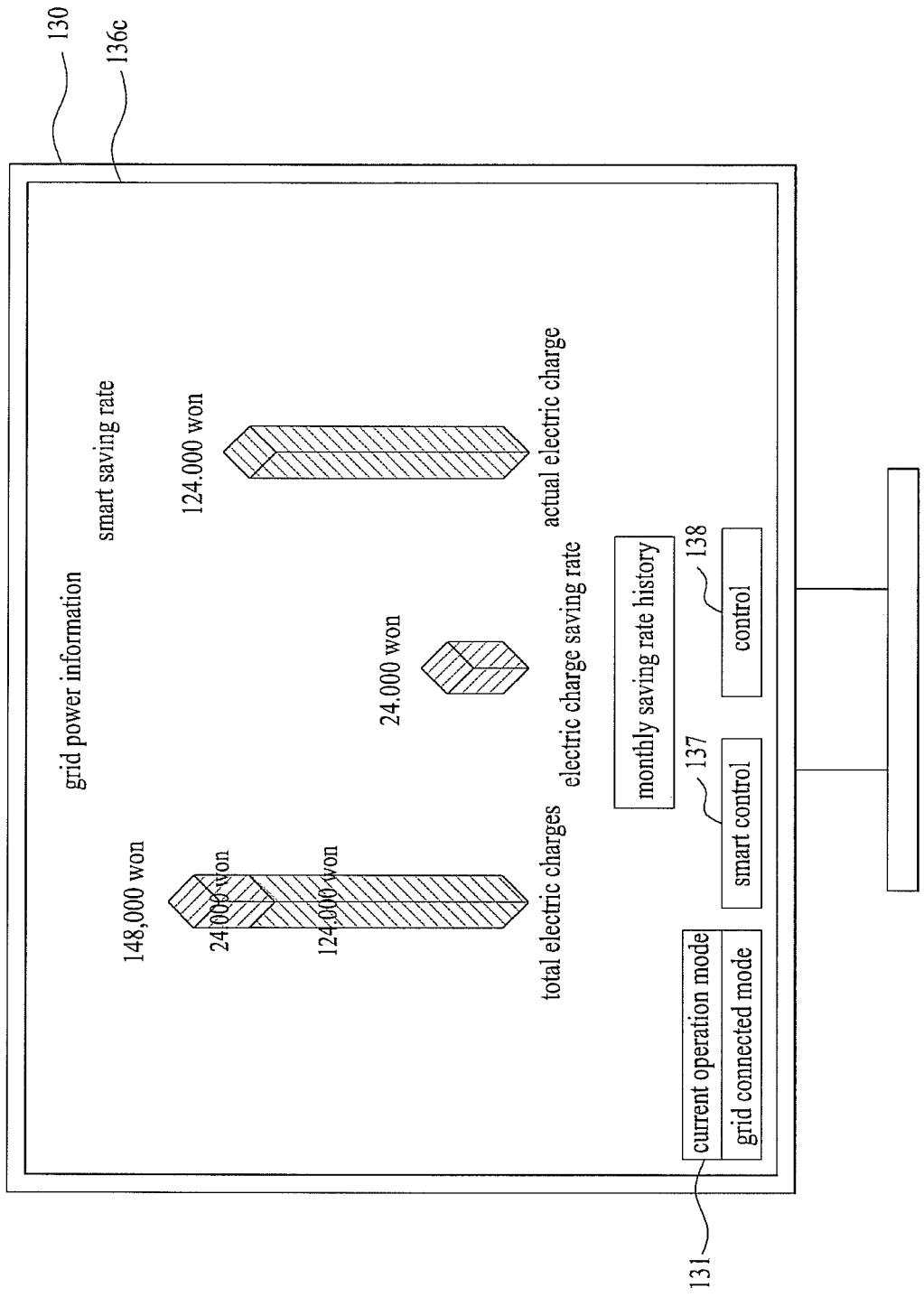
Figure 13D:
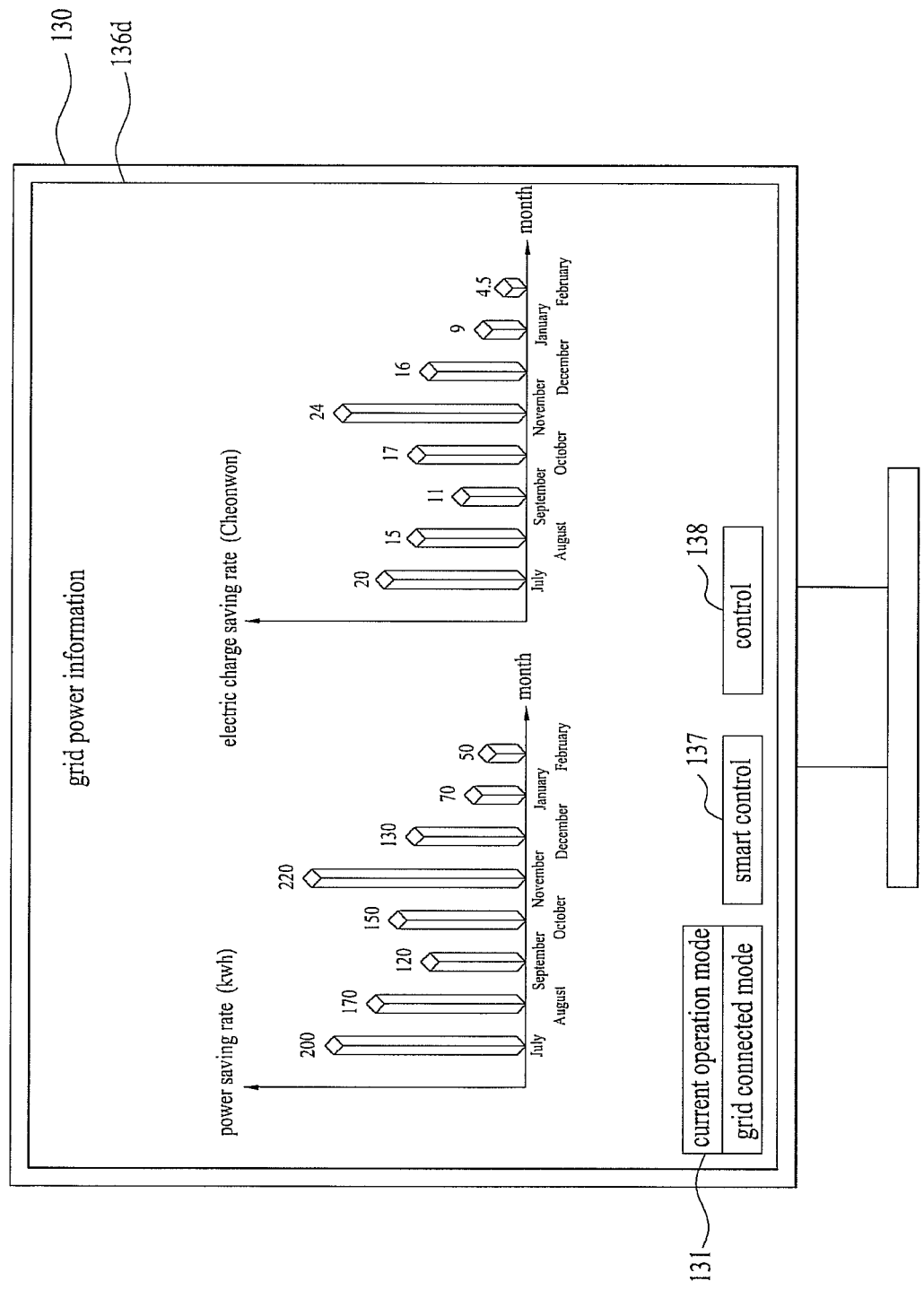
Figure 13E:
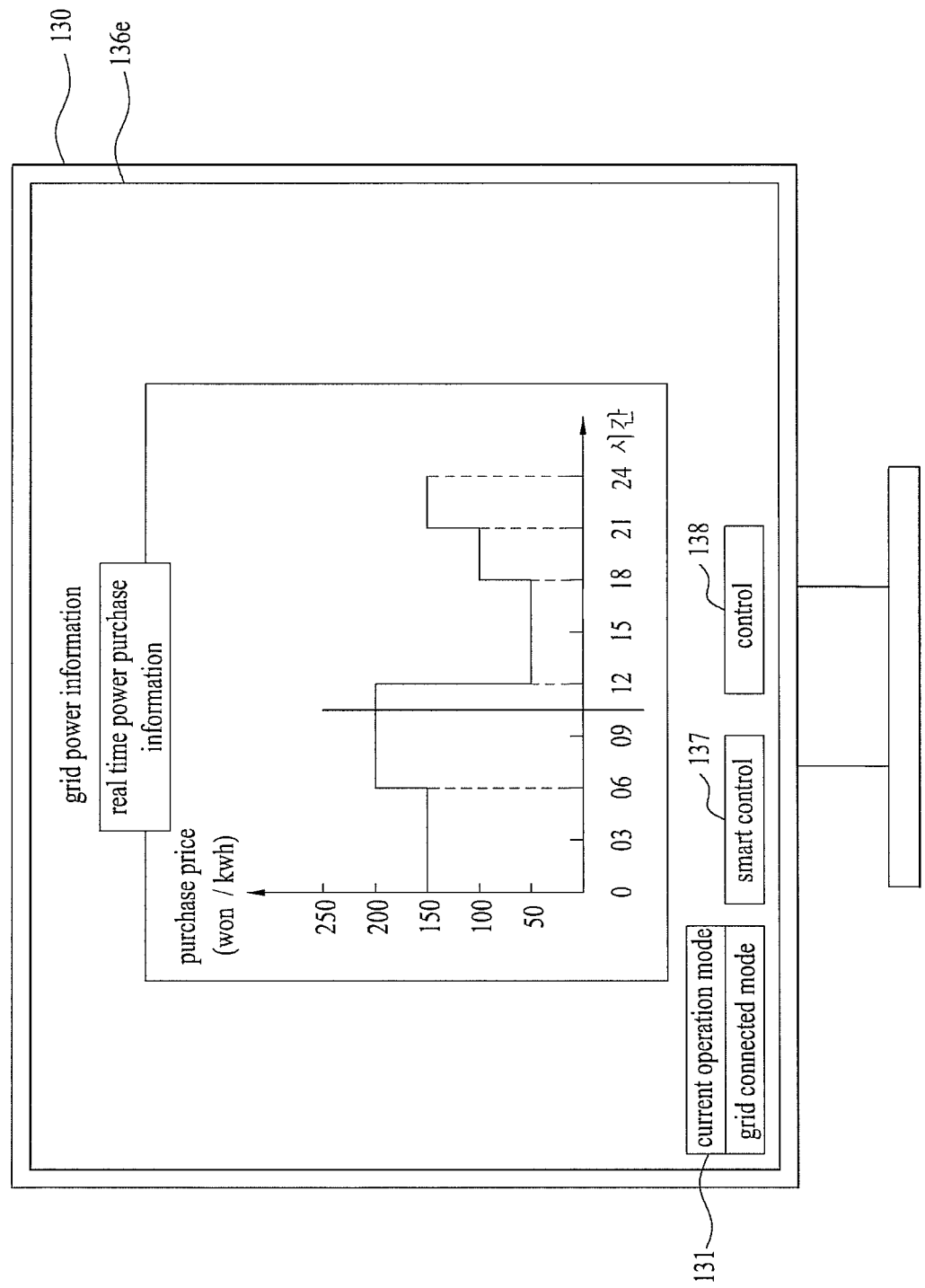

FIGS. 12a to 12c are diagrams illustrating a control screen of a PV inverter displayed by the control device 100 of FIG. 11. As described above, the control device 100 may be one of a computer, a home server, an energy management device. However, for convenience of description, the control device 100 which is the computer will be described.

FIG. 12a illustrates a PV inverter control screen displayed in the display module of the control device 100.

As shown in FIG. 12a, the PV inverter control screen includes information on the PV inverter. The information on the PV inverter includes information on a current operation mode and a current time of the PV inverter 30 and information 133 on an operation state of the PV inverter 30. The information 133 on the operation state of the PV inverter includes an input voltage measurement value or input current measurement value input to the PV inverter 30, an output voltage measurement value or output current measurement value output from the PV inverter 30, information (electric power generation per unit time, daily accumulated electric power generation, and monthly accumulated electric power generation) on the electric power generation of the PV inverter 30, information on the amount of sunshine of the current time, and information on the electric power generation of the amount of sunshine of the current time. However, these are only exemplary, and the present invention is not limited to the above examples and may further include additional information.

The information 133 on the operation state of the PV inverter may be displayed in a graph or diagram. To this end, the display module of the control device 100 includes an entire graph icon 133b displaying the information on the operation state of the PV inverter in a graph during selection and a separate graph icon 133a separately displaying the information on the operation state of the PV inverter in a graph or diagram during selection.

The PV inverter control screen 133 displayed in the display module of the control device 100 includes an operation icon 132 operating the PV inverter 30, a pause icon 132 pausing the PV inverter 30 currently in operation, and a control icon 132 controlling the operation state of the PV inverter 30 or the operation mode of the PV inverter 30.

Also, the PV inverter control screen includes a grid power information icon 134 providing the user with information on electric energy supplied from the grid 70 during selection. If the grid power information icon 134 is selected, the grid power information screen displayed in the display module 130 of the control device 100 will be described in detail with reference to FIG. 12d.

FIG. 12b illustrates information on the PV inverter in graphs, and FIG. 12c is an enlarged view of one of the graphs of FIG. 12b.

As shown in FIG. 12b, if the separate graph icon 133 of FIG. 12a is selected, the control module 190 of the control device 100 controls the display module to display the selected one of the information on the PV inverter in the display module 130 in a graph. For example, unit time electric power generation 135a of the PV inverter 30, daily accumulated electric power generation 135b of the PV inverter 30, and unit time electric power generation 135c of the PV inverter 30 may be displayed in the display module 130 of the control device 100 in two-axis graph.

In this case, an enlarged icon enlarging a corresponding graph may be arranged near each graph displayed in the display module.

As shown in FIG. 12c, if the enlarged icon of FIG. 12b is selected, the control module 190 of the control device 100 controls the display module to display the selected graph in the display module 130 of the control device 100 as an entire screen (or enlarged screen). For example, the graph of unit time electric power generation 135a of the PV inverter 30 may be displayed in the display module as the entire screen.

FIGS. 13a to 13e are diagrams illustrating a grid power information screen displaying information (that is, grid power information 136) on the electric energy supplied from the grid 70.

As shown in FIG. 13a to FIG. 13e, the grid power information 136 is displayed in a graph. The grid power information 136 may include current date energy information, real time power charge information 136a, information 136b on transition of power use for several months, information 136b on transition of power use charge for past several months, information 136c on total electric charges, information 136c on electric charge saving rate, information 136c on actual electric charge, information 136d on monthly saving rate history representing power rate or electric charge saving rate for past several months, and real time power purchase information 136e representing purchase price of the power through the grid 70, which is generated from the PV module and output through the PV inverter 30.

Also, the grid power information screen includes information 131 on the current operation mode of the PV inverter 30, and a control icon 138 that can control the operation mode or the operation state of the PV inverter 30. Moreover, the grid power information screen includes a smart control icon 137. If the smart control icon 137 is selected, the control module of the control device 100 controls the PV inverter 30 so that the electric energy from the PV inverter 30 is supplied to the load module L if the power charge supplied from the grid 70 is expensive (that is, in case of electric charge peak time zone), and the electric energy supplied from the grid 70 is charged in the battery connected with the PV inverter 30 if the power rate is cheap (that is, in case of non-electric charge peak time zone or the lowest electric charge time zone).

Figure 14:
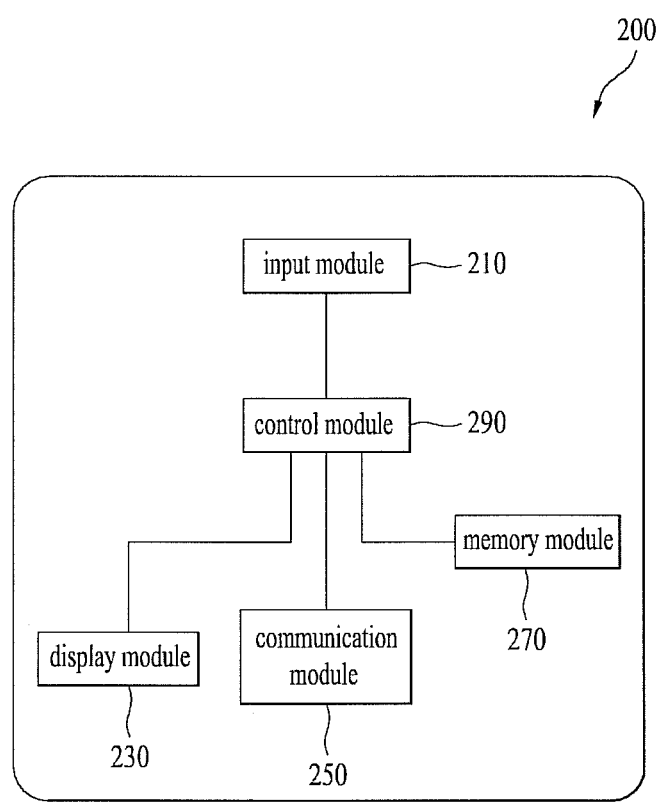
FIG. 14 is a brief block line diagram illustrating a terminal according to the present invention.

FIG. 14 is a brief block line diagram illustrating a terminal 200 according to the present invention.

As shown in FIG. 14, the terminal 200 includes an input module 210 receiving an input signal of the user, a display module 230 displaying the output based on the input signal, a communication module 250 accessible to a wire or wireless communication network, a control module 290 controlling the communication module 250 and converting the input signal to a control signal of the PV converter 30, and a memory module 270 in which a control program or control application is stored.

If the terminal 200 and the control device 100 are linked with each other through a wireless network, the control module 290 of the terminal 200 controls the display module of the terminal 200 to display the screen displayed in the display module of the control device 100 in the display module 230 of the terminal 200. In other words, if the terminal 200 and the control device 100 are linked with each other through a wireless network, the PV inverter control screen and the grid power information screen, which are displayed in the control device 100 of FIGS. 12a to 12c and FIGS. 13a to 13e, are displayed in the display module of the terminal 200.

If the user inputs the input signal through the input module 210 of the terminal 200, the control module 290 of the terminal 200 converts the input signal to the control signal of the PV inverter 3, wherein the control signal is transmitted to the PV inverter 30 through the communication module 250 of the terminal 200, the wireless communication network, and the communication module 190 of the control device 100. In other words, the terminal 200 may be linked with or may remotely control the control device 100 through the wireless communication network, thereby remotely controlling the PV inverter 30.

Also, as additional embodiment of the present invention, the control module 290 of the terminal 200 controls the display module 230 to display information on electric charge corresponding to the electric power generation of the PV module, which is calculated in real time through the control device 100, in the display module 230 of the terminal 200.

Preferably, the terminal 200 is a portable mobile communication terminal 200, more preferably a smart phone.

Figure 15:
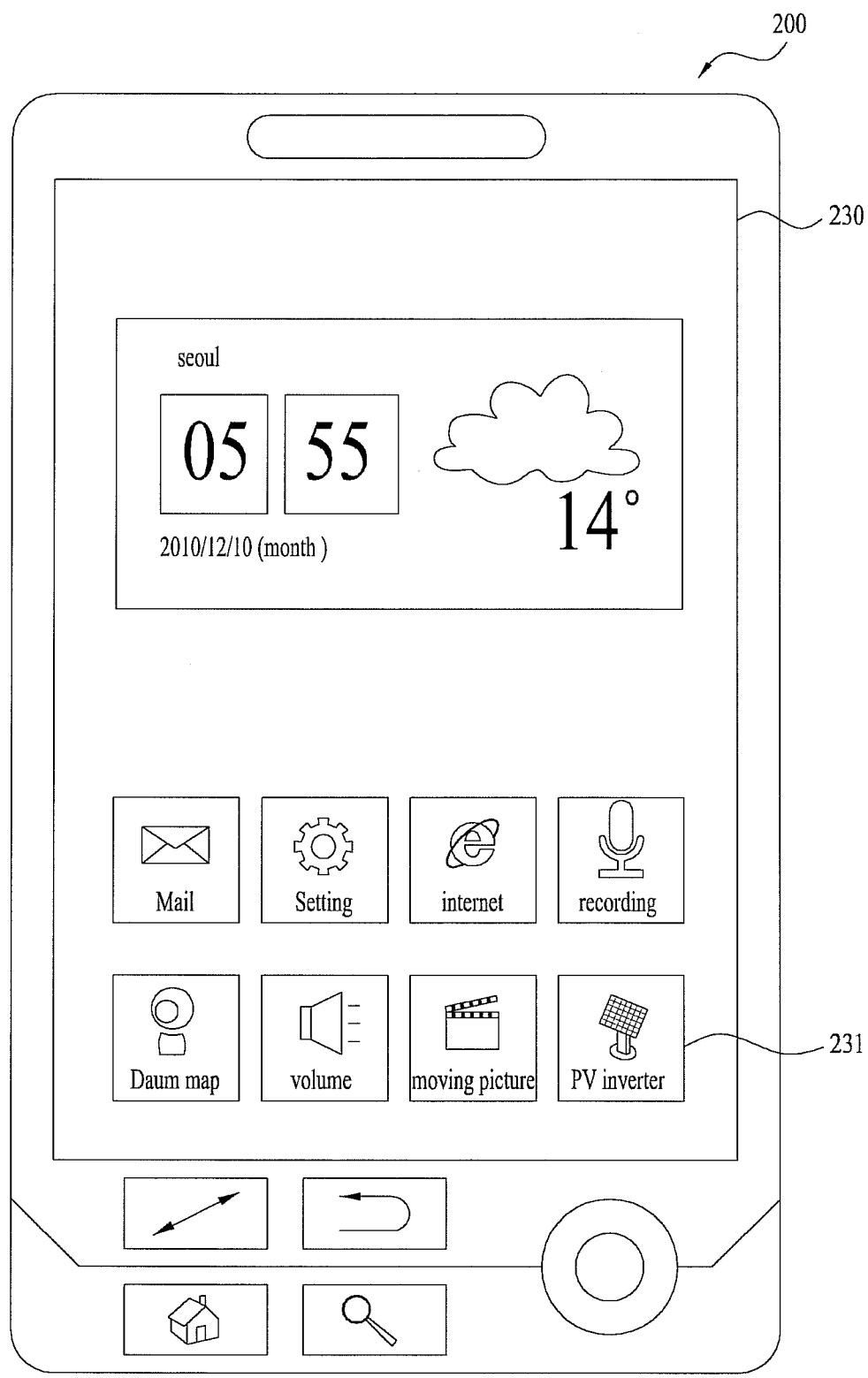
FIG. 15 is a front view illustrating an example of a terminal according to the present invention.

FIG. 15 is a front view illustrating an example of a terminal 200 according to the present invention.

As shown in FIG. 15, the terminal 200 according to the present invention is a smart phone, and the display module of the terminal 200 may be a touch screen and thus may serve as an input module.

Icons for driving various applications may be displayed in the display module 210 of the terminal 200. In order to remotely control the PV inverter 30, the display module of the terminal 200 may include a PV inverter icon 231.

If the PV inverter icon 231 displayed in the display module of the terminal 200 is selected, the control module 290 of the terminal 200 may be linked with the control device 100, which controls the PV inverter, through the communication module 250 of the terminal 200, the wireless network, the communication module 150 of the control device 100, and the control module 190 of the control device 100.

The memory module 270 includes an application that displays the information on the PV inverter, which is displayed in the control device 100, in the display module through the wireless communication network and controls the PV inverter 30 through the control device 100.

Figure 16A:
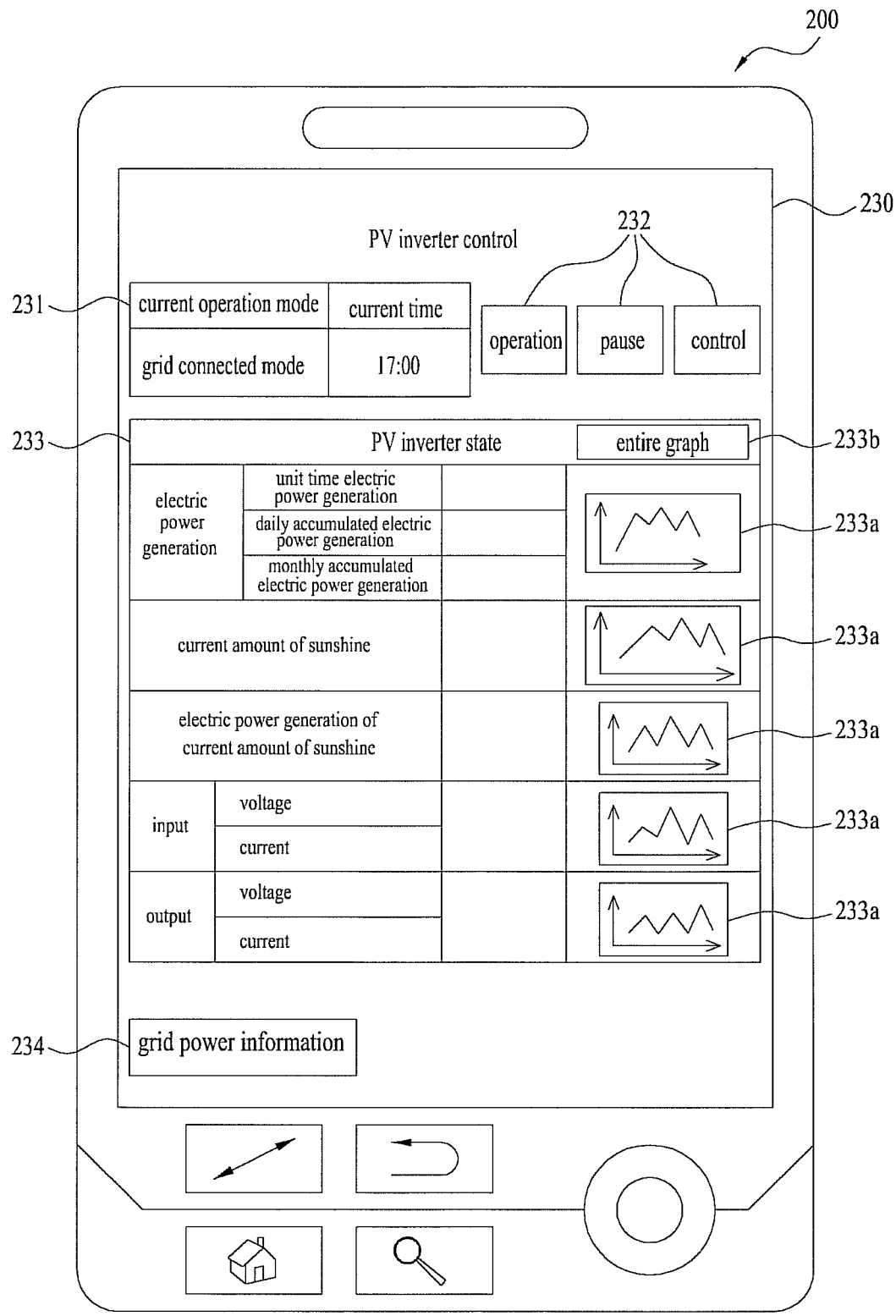
FIGS. 16a to 16c are diagrams illustrating a PV inverter control screen displayed in the terminal of FIG. 13 and FIG. 14.
Figure 16B:
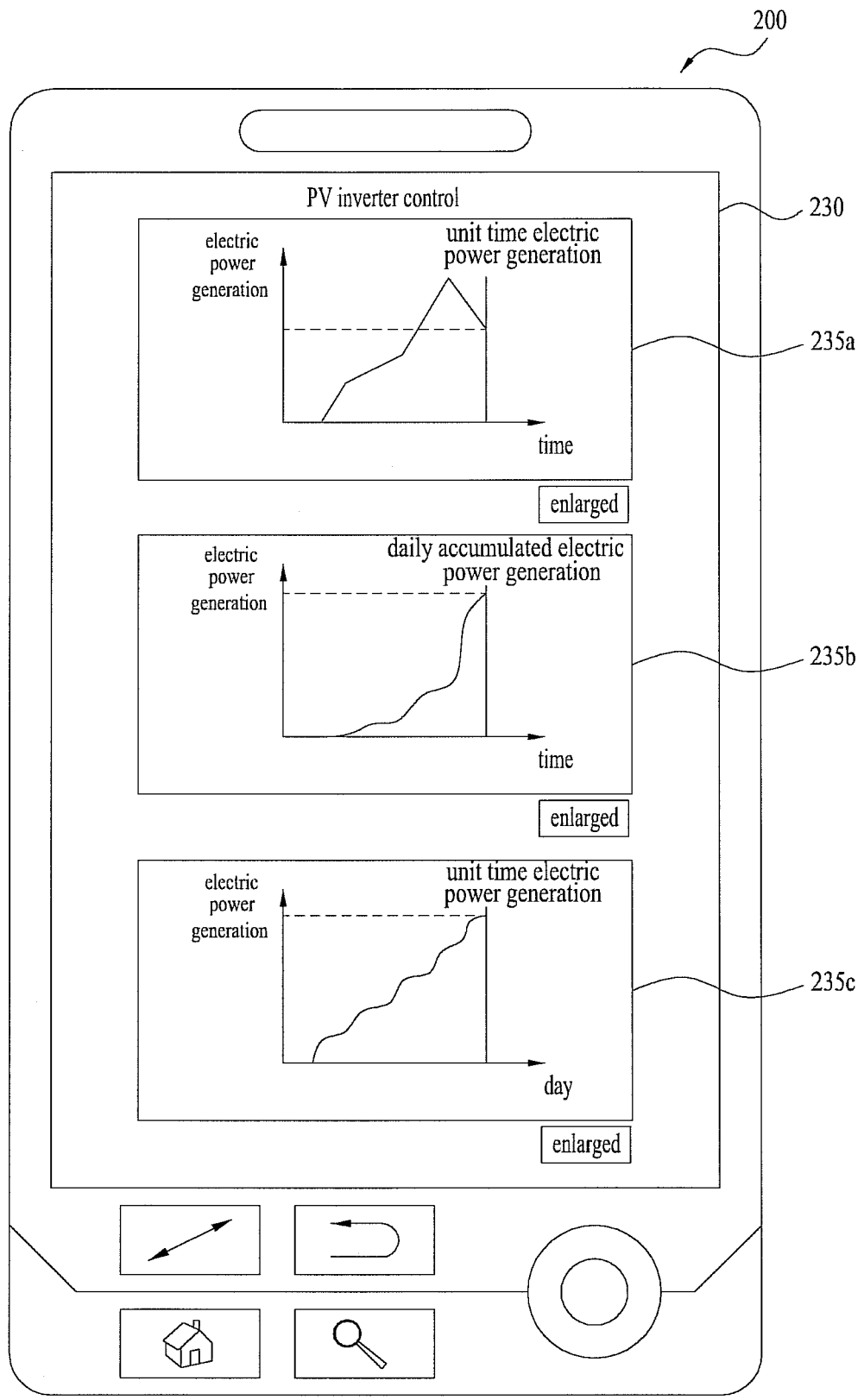
Figure 16C:
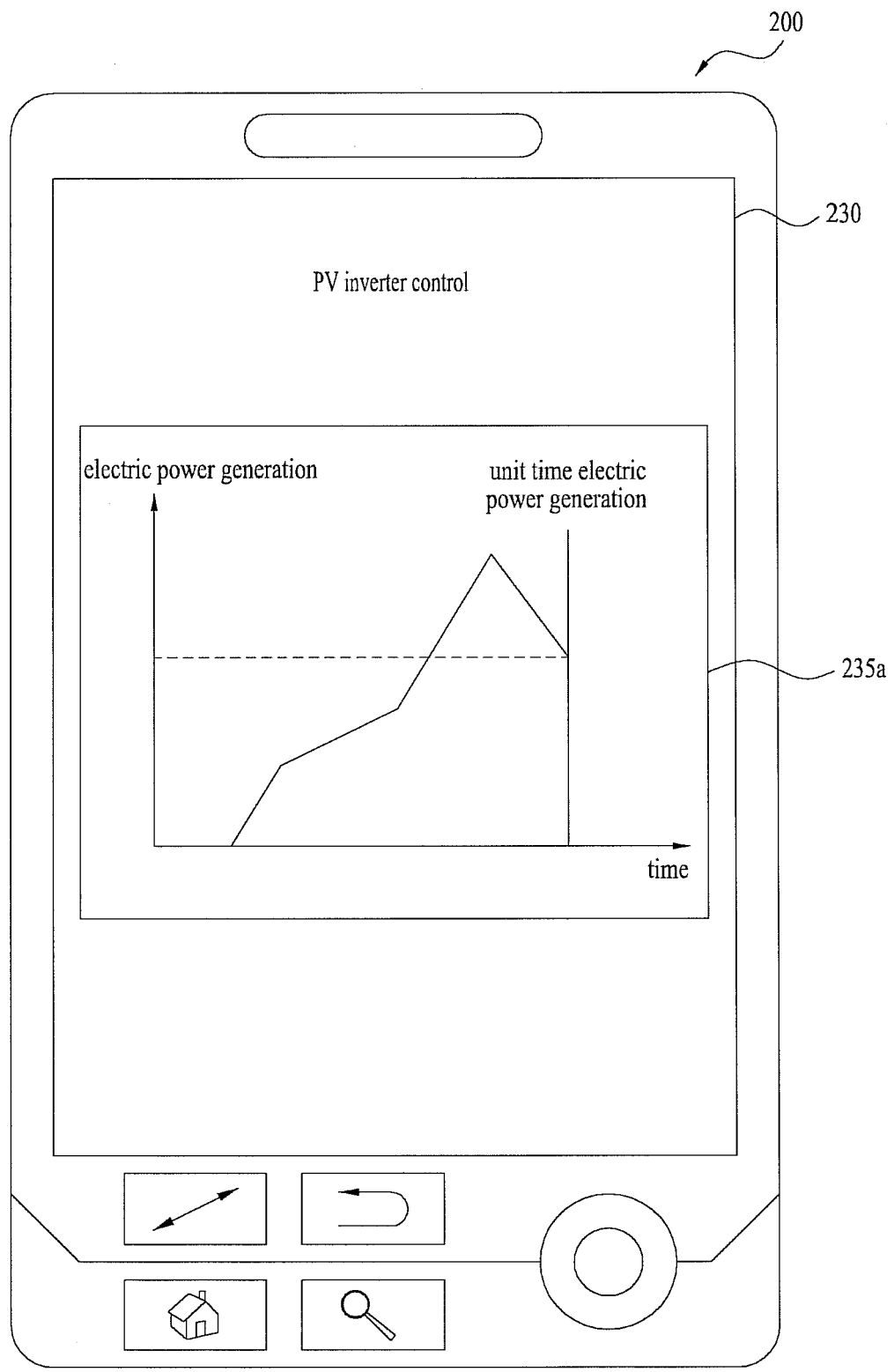
Figure 17A:
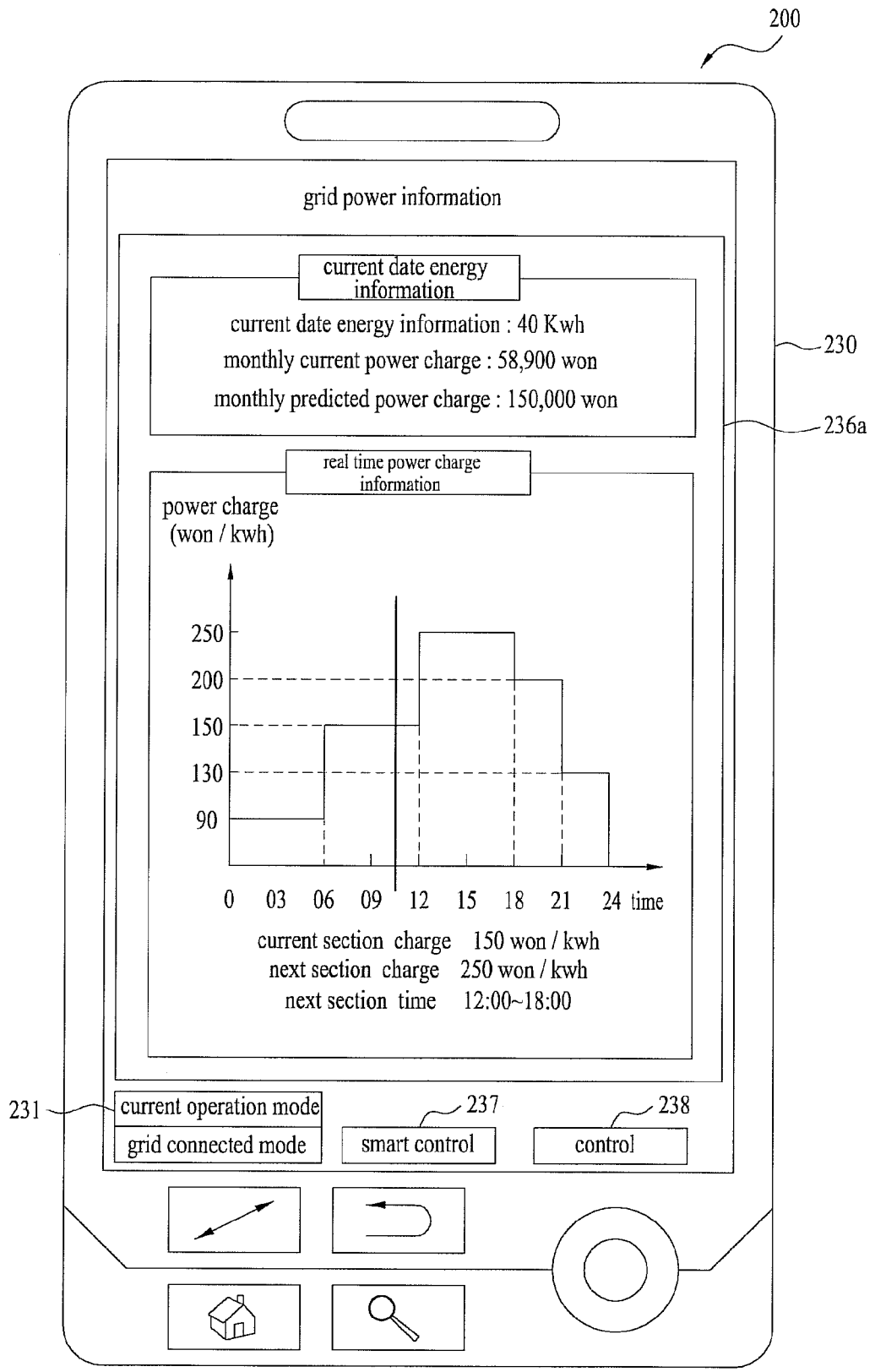
FIGS. 17a to 17e are diagrams illustrating a PV inverter control screen and a grid power information screen displayed in the terminal of FIG. 13 and FIG. 14.
Figure 17B:
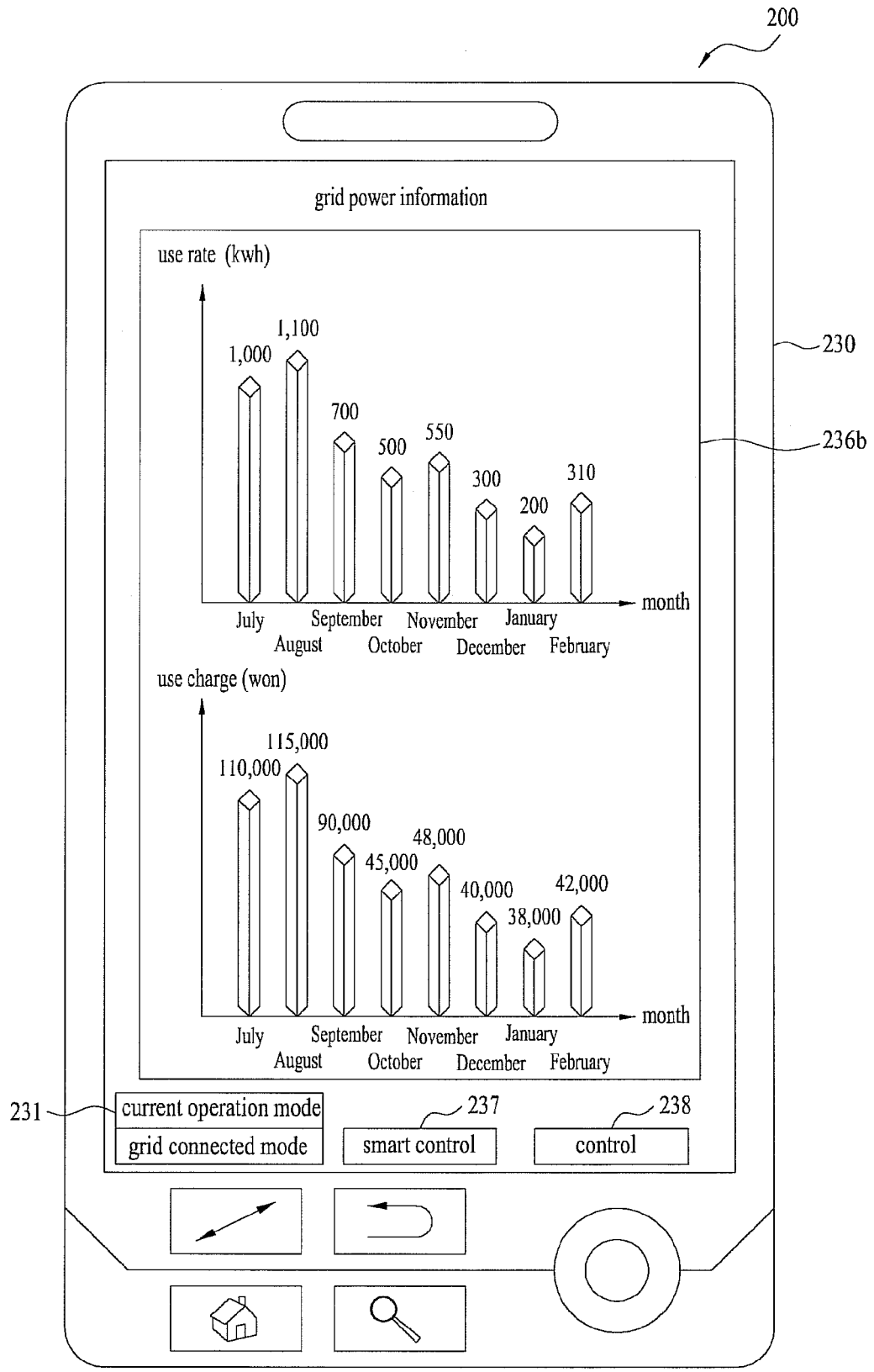
Figure 17C:
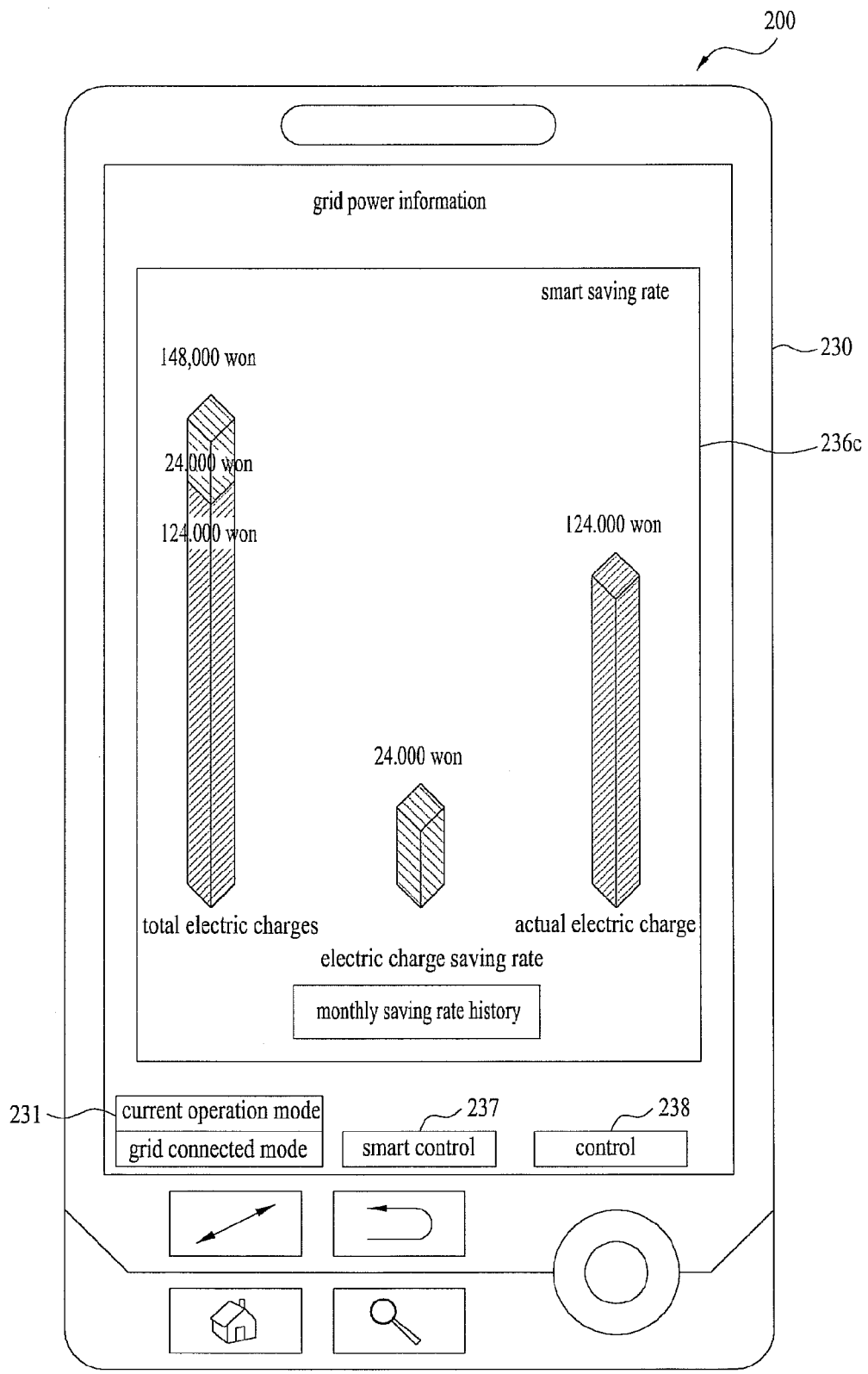
Figure 17D:
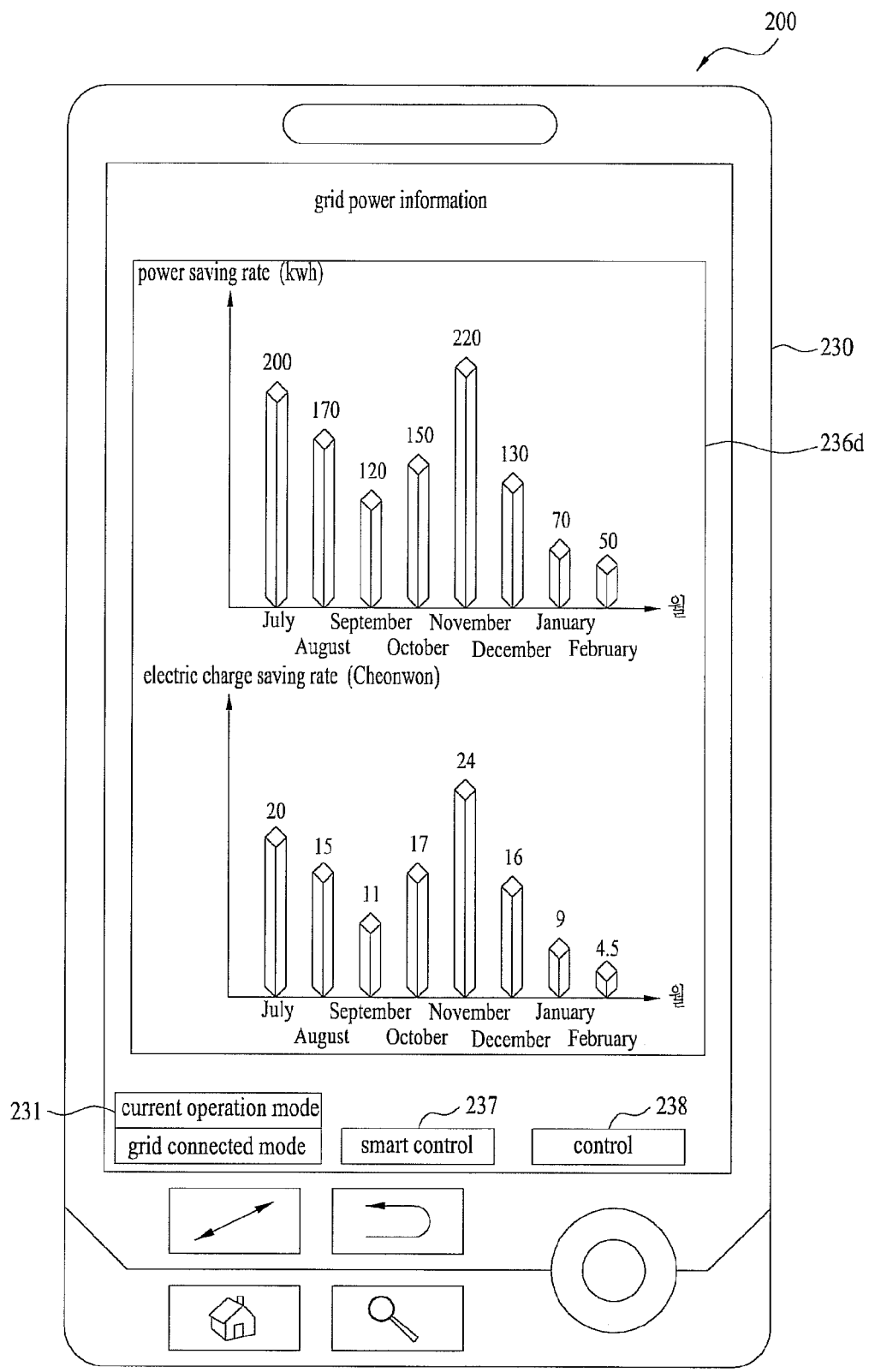
Figure 17E:
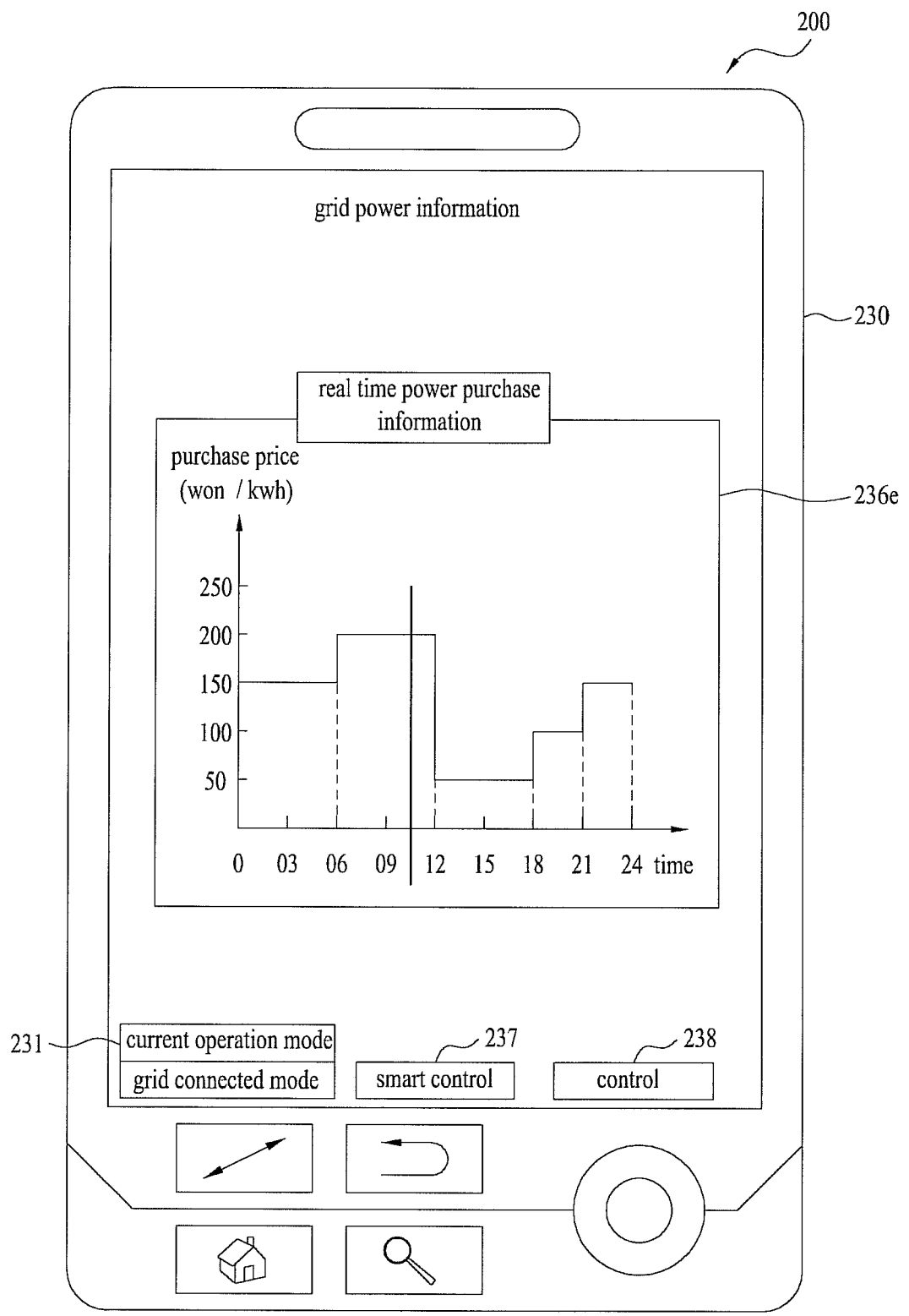

FIGS. 16a to 16c are diagrams illustrating a control screen of a PV inverter displayed in the terminal 200 of FIG. 13 and FIG. 14.

FIGS. 16a to 16c illustrate a grid power information screen and a PV inverter control screen displayed in the display module 230 of the terminal 200. The PV inverter control screen displayed in the display module of the terminal 200 corresponds to each PV inverter control screen displayed in the display module of the control device 100 shown in FIGS. 12a to 12c.

If the PV inverter icon 231 included in the display module of the terminal 200 is selected, the control module of the terminal 200 controls the display module 230 to display the information on the PV inverter, which is displayed in the control device 100 and received through the communication module of the terminal 200, or the grid power information screen in the display module 230.

As shown in FIG. 16c, if one of the graphs representing the information on the PV inverter shown in FIG. 16b is selected, the control module of the terminal 200 controls the display module 230 to display the selected information (or graph corresponding to this information) on the PV inverter or the grid power information screen (or graph corresponding to this screen) as an enlarged screen.

Also, the information (or graph corresponding to this information) on the PV inverter, which is displayed in the display module of the terminal 200 as shown in FIGS. 16a to 16c, may be moved in up and down direction and left and right direction in accordance with a scroll mode. In other words, the control module of the terminal 200 may control the display module to move the information on the PV inverter, which is displayed in the display module of the terminal 200, in up and down direction and left and right direction in accordance with a scroll mode.

Moreover, as shown in FIG. 16, the display module of the terminal 200 includes an operation icon generating a control signal for operating the PV inverter 30, a pause icon generating a control signal for pausing the PV inverter 30, and a control icon that can control the operation state of the PV inverter 30. In other words, the control module of the terminal 200 may control the display module to display the operation icon generating a control signal for operating the PV inverter 30 during selection, the pause icon generating a control signal for operating the PV inverter 30 during selection, and the control icon that can control the operation state of the PV inverter during selection in the display module of the terminal 200.

FIGS. 17a to 17e are diagrams illustrating a grid power information screen displayed in the terminal 200 of FIG. 13 and FIG. 14.

FIGS. 17a to 17e illustrate a grid power information screen displayed in the display module 230 of the terminal 200. The grid power information screen displayed in the display module of the terminal 200 corresponds to each grid power information screen displayed in the display module of the control device 100 shown in FIGS. 13a to 13e.

Also, the grid power information screen (or graph corresponding to this screen) displayed in the display module of the terminal 200 as shown in FIGS. 17a to 17e may be moved in up and down direction and left and right direction in accordance with a scroll mode. In other words, the control module of the terminal 200 may control the display module to move the grid power information displayed in the display module of the terminal 200 in up and down direction and left and right direction in accordance with a scroll mode.

Figure 18:
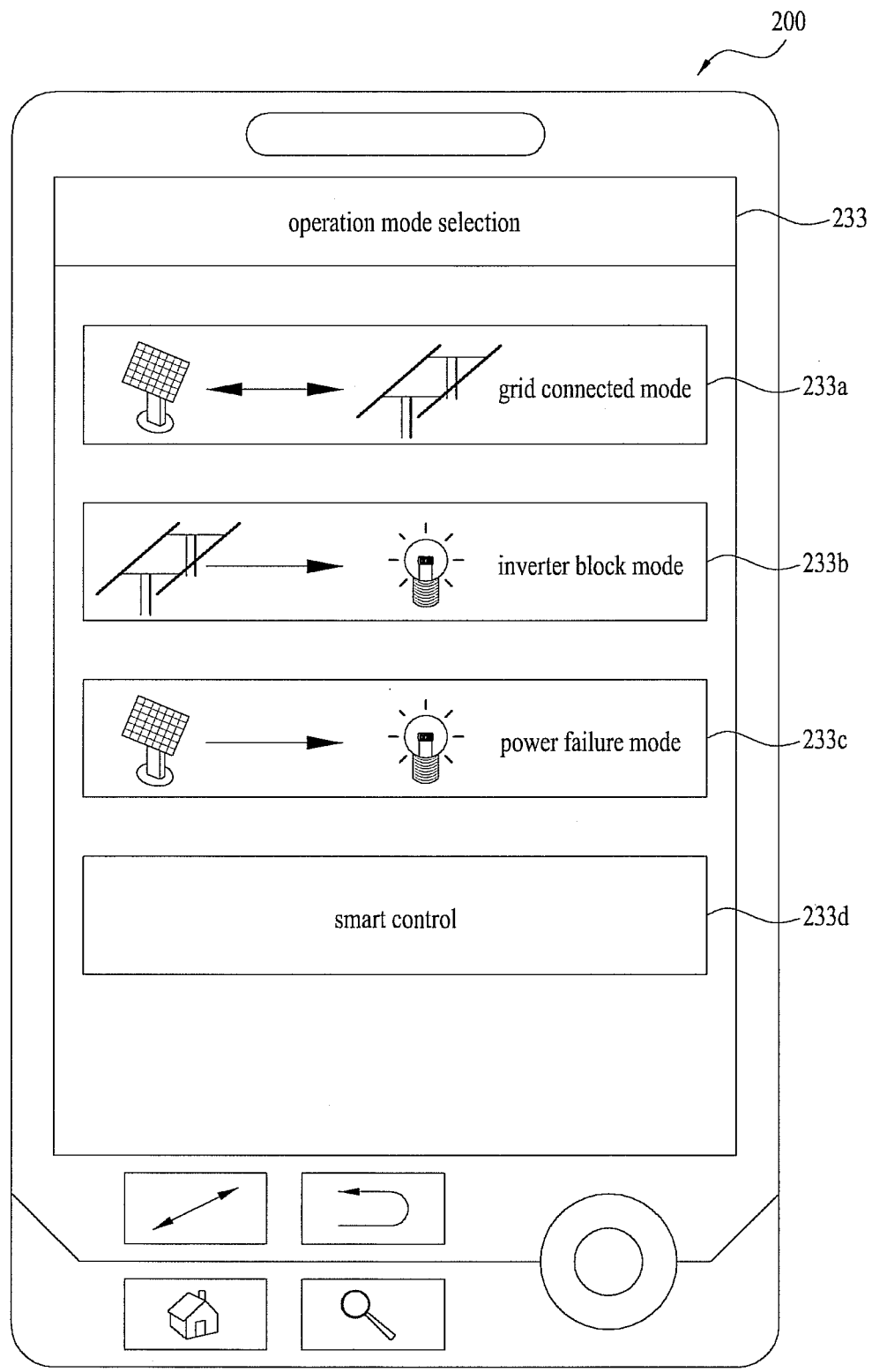
FIG. 18 is a diagram illustrating a selection screen of a PV inverter operation mode displayed in a display module of a terminal.

FIG. 18 is a diagram illustrating a PV inverter operation mode selection screen 233 displayed in a display module of a terminal 200.

As shown in FIG. 18, if the control icon shown in FIG. 16a is selected, the control module 290 of the terminal 200 may control the display module 230 to display the PV inverter operation mode selection screen 233 in the display module 230, wherein the PV inverter operation mode selection screen 233 includes operation mode selection icons 233a, 233b, 233c and 233d of the PV inverter 30. Examples of the operation mode selection icons of the PV inverter include a grid connected mode icon 233a corresponding to the grid connected mode of the PV inverter 30, an inverter block mode icon 233b corresponding to the inverter block mode of the PV inverter 30, and a power failure mode icon 233c corresponding to the power failure mode of the PV inverter 30, as described above. If each icon corresponding to the PV inverter operation mode is selected, the terminal 200 may control the operation mode of the PV inverter 30 in accordance with the selected operation mode in conjunction with the control device 100.

Moreover, the PV inverter operation mode selection screen 233 may further include a smart control icon 233d controlling the PV inverter in a smart grid mode during selection. If the smart control icon 233d is selected, the control module 290 of the terminal 200 may transmit a control signal to the PV inverter through the control device so that the electric energy from the PV inverter 30 is supplied to the load module L if the power charge supplied from the grid 70 is expensive (that is, in case of electric charge peak time zone), and may transmit a control signal controlling the PV inverter 30 to the PV inverter 30 through the control device so that the electric energy supplied from the grid 70 is charged in the battery connected with the PV inverter 30, if the power rate is cheap (that is, in case of non-electric charge peak time zone or the lowest electric charge time zone). In other words, if the smart control icon 233d is selected, the control module 290 of the terminal 200 may transmit the control signal controlling the PV inverter to the PV inverter through the control device in accordance with a consumed power (for example, electric charge) saving mode (that is, smart grid mode) on the basis of power information (for example, information on electric charge) from the grid (or power supply source) received from the smart meter 300.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A photovoltaic (PV) power generation system comprising:
    a meter to determine power information in real time and perform bidirectional communication with a power supply grid, and the meter to perform bidirectional communication with a load module;
    a PV inverter to invert a direct current (DC) electric energy to an alternating current (AC) electric energy;
    a PV module to provide the DC electric energy to the PV inverter;
    a first communication module provided at the PV inverter to transmit information related to the PV inverter;
    a control device having a second communication module to receive the information related to the PV inverter from the first communication module and to receive the power information from the meter, and the control device to control an operation mode of the PV inverter based on the received information related to the PV inverter and the received power information from the meter; and
    a terminal to wirelessly communicate with the control device, and the terminal to display the information related to the PV inverter, wherein the operation modes of the PV inverter include a grid connect mode to connect power from the PV inverter with an external grid, an inverter block mode to block a transmission line between the PV inverter to the external grid when the PV inverter is in error, and a power failure mode to use power from the PV inverter as consumed power during a power failure, and wherein the control device selectively supplies or blocks the electric energy, among the load, the PV inverter and the external grid in accordance with an input signal of a user through at least one of the terminal and the control device and the operation mode of the PV inverter.

2. The photovoltaic power generation system according to claim 1, wherein the information related to the PV inverter includes:
    an input voltage measurement value or an input current measurement value input to the PV inverter,
    an output voltage measurement value or an output current measurement value output from the PV inverter,
    information on an operation state of the PV inverter,
    information on an operation mode of the PV inverter, or
    information on electric power generation of the PV inverter.

3. The photovoltaic power generation system according to claim 1, wherein the first communication module of the PV inverter is either a zigbee communication module or a Bluetooth communication module, and the second communication module of the control device is either a zigbee communication module or a Bluetooth communication module.

4. The photovoltaic power generation system according to claim 1, wherein the terminal includes:
    an input module to receive an input from a user,
    a display module to display an output based on the input from the user,
    a third communication module to access a wireless communication network, or
    a control module to control the display module and the third communication module, and the control module to convert the input from the user into a control signal for the PV inverter.

5. The photovoltaic power generation system according to claim 4, wherein the control module controls the display module to display the information related to the PV inverter, which is received from the PV inverter through the third communication module.

6. The photovoltaic power generation system according to claim 5, wherein when a part of the displayed information related to the PV inverter is selected, the control module controls the display module to display the information related to the PV inverter as an enlarged screen.

7. The photovoltaic power generation system according to claim 5, wherein the control module controls the display module to move the displayed information related to the PV inverter in an up or down direction and a left or right direction when the display module is in a scroll mode.

8. The photovoltaic power generation system according to claim 5, wherein the control module of the terminal controls the display module to display an operation icon for generating a control signal for operating the PV inverter, a pause icon for generating a control signal for pausing the PV inverter, and a control icon for controlling the operation state of the PV inverter.

9. The photovoltaic power generation system according to claim 8, wherein, when the control icon is selected, the control module of the terminal controls the display module to display an operation mode selection icon of the PV inverter.

10. The photovoltaic power generation system according to claim 4, wherein the display module of the terminal displays a control icon for transmitting a control signal for controlling the PV inverter to the PV inverter through the control device in a consumed power saving mode based on the power information from the grid, which is received from the meter when the control icon is selected.

11. The photovoltaic power generation system according to claim 1, wherein the meter transmits information on an electric charge to the control device, and the control device determines an electric charge corresponding to electric power generation of a PV module based on the power information.

12. A photovoltaic (PV) power generation system comprising:
    a PV module to provide a direct current (DC) electric energy;
    a PV inverter to change the DC electric energy from the PV module to an alternating current (AC) electric energy;

a battery provided at the PV inverter, to charge a power supplied from the PV module or a power supply, or to discharge charged power to the power supply or a load;

a control device to control supplying and blocking of electric energy from the PV module, the power supply, the load, the battery, and the PV inverter; and a terminal to control the control device through a wireless communication network, the terminal to transmit, to the control device, a control signal corresponding to one of first to third operation modes based on an input from a user wherein the operation modes of the PV inverter include a grid connect mode to connect power from the PV inverter with an external grid, an inverter block mode to block a transmission line between the PV inverter to the external grid when the PV inverter is in error, and a power failure mode to use power from the PV inverter as consumed power during a power failure, and wherein the control device selectively supplies or blocks the electric energy among the load, the PV inverter and the external grid in accordance with an input signal of a user through at least one of the terminal and the control device and the operation mode of the PV inverter.

13. The photovoltaic power generation system according to claim 12, wherein, when the terminal transmits the control signal corresponding to the first operation mode to the control device, the control device controls the photovoltaic power generation system to transmit the AC electric energy to the power supply by inverting the DC electric energy from the PV module to the AC electric energy or to charge the battery by inverting the AC electric energy supplied from the power supply to the DC electric energy.

14. The photovoltaic power generation system according to claim 12, wherein, when the terminal transmits the control signal corresponding to the second operation mode to the control device, the control device controls the photovoltaic power generation system to block an electric energy transmission line between the PV inverter and the power supply and an electric energy transmission line between the PV inverter and the load.

15. The photovoltaic power generation system according to claim 12, wherein the terminal includes:
    an input module to receive an input from a user,
    a display module to display an output based on the input from the user,
    a third communication module to access a wireless communication network, or
    a control module to control the display module and the third communication module, and the control module to convert the input from the user into a control signal for the PV inverter.

* * * * *